US012643575B2

(12) United States Patent     (10) Patent No.: US 12,643,575 B2

Yang et al.     (45) Date of Patent: Jun. 2, 2026

(54) AUTOMATIC ANNOTATION OF OBJECT TRAJECTORIES IN MULTIPLE DIMENSIONS

(71) Applicant: Aurora Operations, Inc., Pittsburgh, PA (US)

(72) Inventors: Bin Yang, Toronto (CA); Ming Liang, Toronto (CA); Wenyuan Zeng, Toronto (CA); Min Bai, Toronto (CA); Raquel Urtasun, Toronto (CA)

(73) Assignee: AURORA OPERATIONS, INC., Pittsburgh, PA (US)

( * ) Notice: Subject to any disclaimer, the term of this patent is extended or adjusted under 35 U.S.C. 154(b) by 83 days.

(21) Appl. No.: 18/883,299

(22) Filed: Sep. 12, 2024

(65) Prior Publication Data

US 2025/0002050 A1     Jan. 2, 2025

Related U.S. Application Data

(63) Continuation of application No. 17/528,559, filed on Nov. 17, 2021, now Pat. No. 12,116,015.

(Continued)

(51) Int. Cl.
    *B60W 60/00*     (2020.01)
    *G05D 1/00*     (2024.01)
    (Continued)

(52) U.S. Cl.
    CPC ....... *B60W 60/0027* (2020.02); *G05D 1/0221* (2013.01); *G05D 1/0231* (2013.01);
    (Continued)

(58) Field of Classification Search
    CPC ..... B60W 60/0027; B60W 2554/4041; B60W 2554/4026; B60W 2554/4029;
    (Continued)

(56) References Cited

U.S. PATENT DOCUMENTS

| | | |
|---|---|---|
| 2012/0093358 A1 | 4/2012 | Kurien |
| 2012/0093359 A1* | 4/2012 | Kurien .................. G06V 10/95 382/103 |
| 2020/0086863 A1* | 3/2020 | Rosman ................ G06V 20/58 |

OTHER PUBLICATIONS

Acuna et al., "Efficient Annotation of Segmentation Datasets with Polygon-RNN++", arXiv:1803.09693v1, Mar. 26, 2018, 21 pages.

(Continued)

*Primary Examiner* — Andrew J Cromer

(74) *Attorney, Agent, or Firm* — Dority & Manning, P.A.

(57) ABSTRACT

Techniques for improving the performance of an autonomous vehicle (AV) by automatically annotating objects surrounding the AV are described herein. A system can obtain sensor data from a sensor coupled to the AV and generate an initial object trajectory for an object using the sensor data. Additionally, the system can determine a fixed value for the object size of the object based on the initial object trajectory. Moreover, the system can generate an updated initial object trajectory, wherein the object size corresponds to the fixed value. Furthermore, the system can determine, based on the sensor data and the updated initial object trajectory, a refined object trajectory. Subsequently, the system can generate a multi-dimensional label for the object based on the refined object trajectory. A motion plan for controlling the AV can be generated based on the multi-dimensional label.

20 Claims, 10 Drawing Sheets

Related U.S. Application Data

(60) Provisional application No. 63/114,785, filed on Nov. 17, 2020.

(51) Int. Cl.
| | |
|---|---|
| *G05D 1/249* | (2024.01) |
| *G06N 3/08* | (2023.01) |
| *G06N 20/00* | (2019.01) |

(52) U.S. Cl.
CPC .............. *G05D 1/249* (2024.01); *G06N 3/08* (2013.01); *G06N 20/00* (2019.01); *B60W 2554/4026* (2020.02); *B60W 2554/4029* (2020.02); *B60W 2554/4041* (2020.02); *B60W 2554/4044* (2020.02); *B60W 2556/45* (2020.02)

(58) Field of Classification Search
CPC . B60W 2554/4044; G06N 20/00; G06N 3/08; G05D 1/249; G05D 1/0221; G05D 1/0231
See application file for complete search history.

(56) References Cited

OTHER PUBLICATIONS

Caesar et al., "nuScenes: A Multimodal Dataset for Autonomous Driving", arXiv:1903.11027v5, May 5, 2020, 16 pages.

Casas et al., "Implicit Latent Variable Model for Scene-Consistent Motion Forecasting", arXiv:2007.12036v1, Jul. 23, 2020, 44 pages.

Casas, et al., "IntentNet: Learning to Predict Intention from Raw Sensor Data", arXiv:2102.07907v1, Jan. 20, 2021, 10 pages.

Castrejon et al., "Annotating Object Instances with a Polygon-RNN", Conference on Computer Vision and Pattern Recognition, Jul. 21-26, 2017, Hawaii, United States, pp. 5230-5238.

Chai et al., "Multipath: Multiple Probabilistic Anchor Trajectory Hypotheses for Behavior Prediction", arXiv:1910.05449v1, Oct. 12, 2019, 14 pages.

Chen et al., "Multi-View 3D Object Detection Network for Autonomous Driving", arXiv:1611.07759v3, Jun. 22, 2017, 9 pages.

Engelcke et al., "Vote3Deep: Fast Object Detection in 3D Point Clouds using Efficient Convolutional Neural Networks", arXiv:1609.06666v2, Mar. 5, 2017, 7 pages.

Feichtenhofer et al., Detect to Track and Track to Detect. International Conference on Computer Vision, Oct. 22-29, 2017, Venice, Italy, pp. 3038-3046.

Frossard et al., "StrObe: Streaming Object Detection from LiDAR Packets", arXiv:2011.06425v2, Nov. 13, 2020, 10 pages.

Geiger et al., "Are We Ready for Autonomous Driving? The KITTI Vision Benchmark Suite", Conference on Computer Vision and Pattern Recognition, Jun. 16-21, 2012, Providence, Rhode Island, 8 pages.

He et al., "Structure Aware Single-Stage 3D Object Detection from Point Cloud", Conference on Computer Vision and Pattern Recognition, Jun. 14-19, 2020, Virtual, pp. 11873-11882.

Hu et al., "Joint Monocular 3D Vehicle Detection and Tracking", arXiv:1811.10742v3, Sep. 12, 2019, 18 pages.

Kalman, "A New Approach to Linear Filtering and Prediction Problems", Journal of Basic Engineering, Mar. 1960, pp. 35-45.

Kuhn, "The Hungarian Method for the Assignment Problem", Naval Research Logistics Quarterly, 1955, pp. 83-97.

Lang et al., "PointPillars: Fast Encoders for Object Detection from Point Clouds", arXiv:1812.05784v2, May 7, 2019, 9 pages.

Lee et al., "Leveraging Pre-Trained 3D Object Detection Models for Fast Ground Truth Generation", arXiv:1807.06072v1, Jul. 16, 2018, 7 pages.

Li, "3D Fully Convolutional Network for Vehicle Detection in Point Cloud", arXiv:1611.08069v2, Jan. 16, 017, 5 pages.

Li et al., "Vehicle Detection from 3D Lidar using Fully Convolutional Network", arXiv:1608.07916v1, Aug. 29, 2016, 8 pages.

Liang et al., "PnPNet: End-to-End Perception and Prediction with Tracking in the Loop", arXiv:2005.14711v2, Jun. 27, 2020, 13 pages.

Ling et al., "Fast Interactive Object Annotation with Curve-GCN", Conference on Computer Vision and Pattern Recognition, Jun. 16-20, 2019, Long Beach, California, United States, pp. 5257-5266.

Luo et al., "Fast and Furious: Real Time End-to-End 3D Detection, Tracking and Motion Forecasting with a Single Convolutional Net", arXiv:2012.12395v1, Dec. 22, 2020, 9 pages.

Meng et al., "Weakly Supervised 3D Object Detection from Lidar Point Cloud", arXiv:2007.11901v1, Jul. 23, 2020, 20 pages.

Meyer et al., "LaserNet: An Efficient Probabilistic 3D Object Detector for Autonomous Driving", arXiv:1903.08701v1, Mar. 20, 2019, 10 pages.

Milan et al., "Continuous Energy Minimization for Multitarget Tracking", Transactions on Pattern Analysis and Machine Intelligence, vol. 36, No. 1, Jan. 2014, 15 pages.

Qi et al., "Frustum PointNets for 3D Object Detection from RGB-D Data", arXiv:1711.08488v2, Apr. 13, 2018, 15 pages.

Ronneberger et al., "U-Net: Convolutional Networks for Biomedical Image Segmentation", arXiv:1505.04597v1, May 18, 2015, 8 pages.

Shi et al., "PV-RCNN: Point-Voxel Feature Set Abstraction for 3D Object Detection", arXiv:1912.13192v2, Apr. 9, 2021, 11 pages.

Shi et al., "Point-GNN: Graph Neural Network for 3D Object Detection in a Point Cloud", arXiv:2003.01251v1, Mar. 2, 2020, 9 pages.

Walsh, "Leveraging Temporal Data for Automatic Labelling of Static Vehicles", Conference on Computer and Robot Vision, May 13-15, 2020, Virtual, pp. 134-141.

Wang et al."Latte: Accelerating LiDAR Point Cloud Annotation via Sensor Fusion, One-Click Annotation, and Tracking", arXiv:1904.09085v1, Apr. 19, 2019, 8 pages.

Wang et al., "Fully Motion-Aware Network for Video Object Detection", European Conference on Computer Vision, Sep. 8-14, 2018, Munich, Germany, 16 pages.

Weng et al., "3D Multi-Object Tracking: A Baseline and New Evaluation Metrics", arXiv:1907.03961v5, Jul. 22, 2020, 9 pages.

Yang et al., "HDNET: Exploiting HD Maps for 3D Object Detection", Conference on Robot Learning, Oct. 29-31, 2018, Zurich, Switzerland, 10 pages.

Yang et al., "PIXOR: Real-Time 3D Object Detection from Point Clouds", arXiv:1902.06326v3, Mar. 2, 2019, 10 pages.

Yang et al., "3DSSD: Point-Based 3D Single Stage Object Detector", arXiv:2002.10187v1, Feb. 24, 2020, 9 pages.

Yang et al., STD: Sparse-to-Dense 3D Object Detector for Point Cloud.

Yin et al., "Center-Based 3d Object Detection and Tracking", arXiv:2006.11275v2, Jan. 6, 2021, 12 pages.

Zakharov et al., "Autolabeling 3D Objects with Differentiable Rendering of SDF Shape Priors", arXiv:1911.11288v2, Apr. 2, 2020, 13 pages.

Zhou et al., "VoxelNet: End-to-End Learning for Point Cloud Based 3D Object Detection", arXiv:1711.06396v1, Nov. 17, 2017, 10 pages.

Zhu et al., "Flow-Guided Feature Aggregation for Video Object Detection", arXiv:1703.10025v2, Aug. 18, 2017, 10 pages.

* cited by examiner

570 —

CENTER-ALIGN

OBJECT CENTER

580 —

CORNER-ALIGN

CLOSEST CORNER TO
EGO-CAR

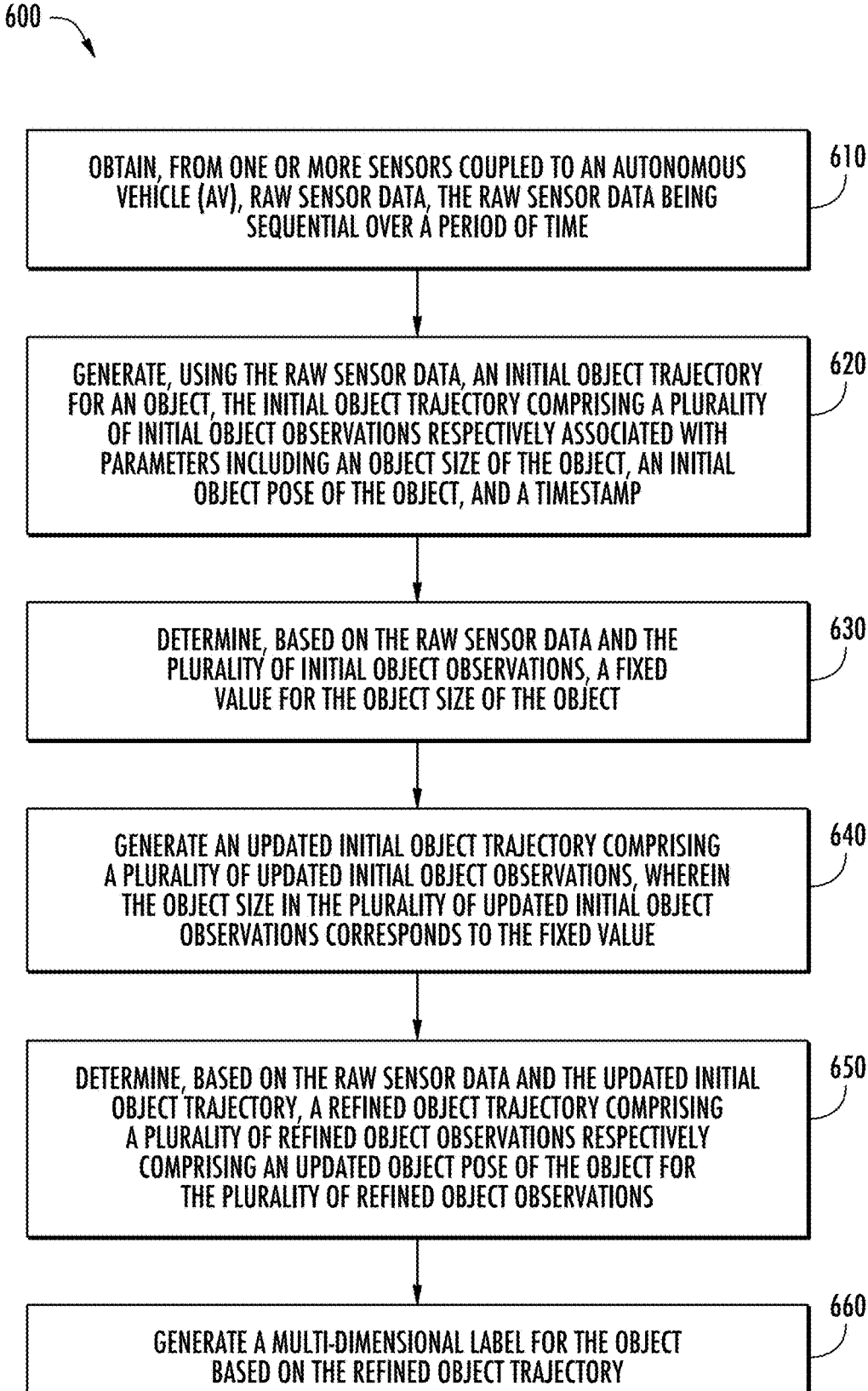

600

OBTAIN, FROM ONE OR MORE SENSORS COUPLED TO AN AUTONOMOUS VEHICLE (AV), RAW SENSOR DATA, THE RAW SENSOR DATA BEING SEQUENTIAL OVER A PERIOD OF TIME — 610

GENERATE, USING THE RAW SENSOR DATA, AN INITIAL OBJECT TRAJECTORY FOR AN OBJECT, THE INITIAL OBJECT TRAJECTORY COMPRISING A PLURALITY OF INITIAL OBJECT OBSERVATIONS RESPECTIVELY ASSOCIATED WITH PARAMETERS INCLUDING AN OBJECT SIZE OF THE OBJECT, AN INITIAL OBJECT POSE OF THE OBJECT, AND A TIMESTAMP — 620

DETERMINE, BASED ON THE RAW SENSOR DATA AND THE PLURALITY OF INITIAL OBJECT OBSERVATIONS, A FIXED VALUE FOR THE OBJECT SIZE OF THE OBJECT — 630

GENERATE AN UPDATED INITIAL OBJECT TRAJECTORY COMPRISING A PLURALITY OF UPDATED INITIAL OBJECT OBSERVATIONS, WHEREIN THE OBJECT SIZE IN THE PLURALITY OF UPDATED INITIAL OBJECT OBSERVATIONS CORRESPONDS TO THE FIXED VALUE — 640

DETERMINE, BASED ON THE RAW SENSOR DATA AND THE UPDATED INITIAL OBJECT TRAJECTORY, A REFINED OBJECT TRAJECTORY COMPRISING A PLURALITY OF REFINED OBJECT OBSERVATIONS RESPECTIVELY COMPRISING AN UPDATED OBJECT POSE OF THE OBJECT FOR THE PLURALITY OF REFINED OBJECT OBSERVATIONS — 650

GENERATE A MULTI-DIMENSIONAL LABEL FOR THE OBJECT BASED ON THE REFINED OBJECT TRAJECTORY — 660

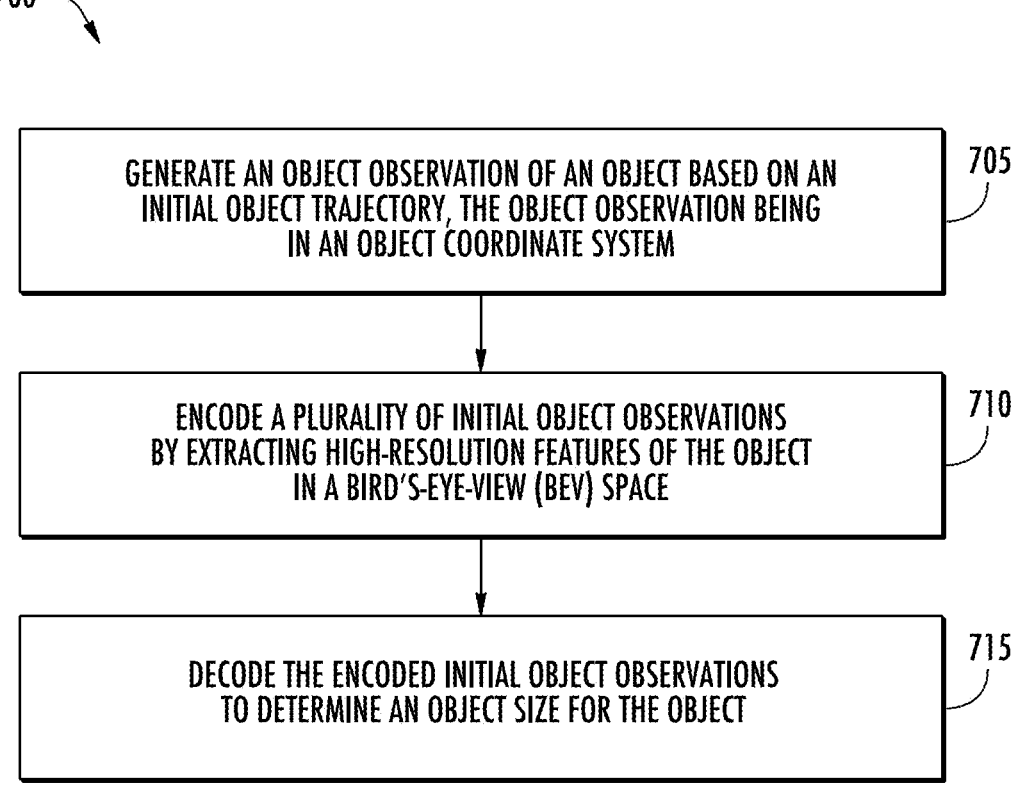

GENERATE AN OBJECT OBSERVATION OF AN OBJECT BASED ON AN INITIAL OBJECT TRAJECTORY, THE OBJECT OBSERVATION BEING IN AN OBJECT COORDINATE SYSTEM

705

ENCODE A PLURALITY OF INITIAL OBJECT OBSERVATIONS BY EXTRACTING HIGH-RESOLUTION FEATURES OF THE OBJECT IN A BIRD'S-EYE-VIEW (BEV) SPACE

710

DECODE THE ENCODED INITIAL OBJECT OBSERVATIONS TO DETERMINE AN OBJECT SIZE FOR THE OBJECT

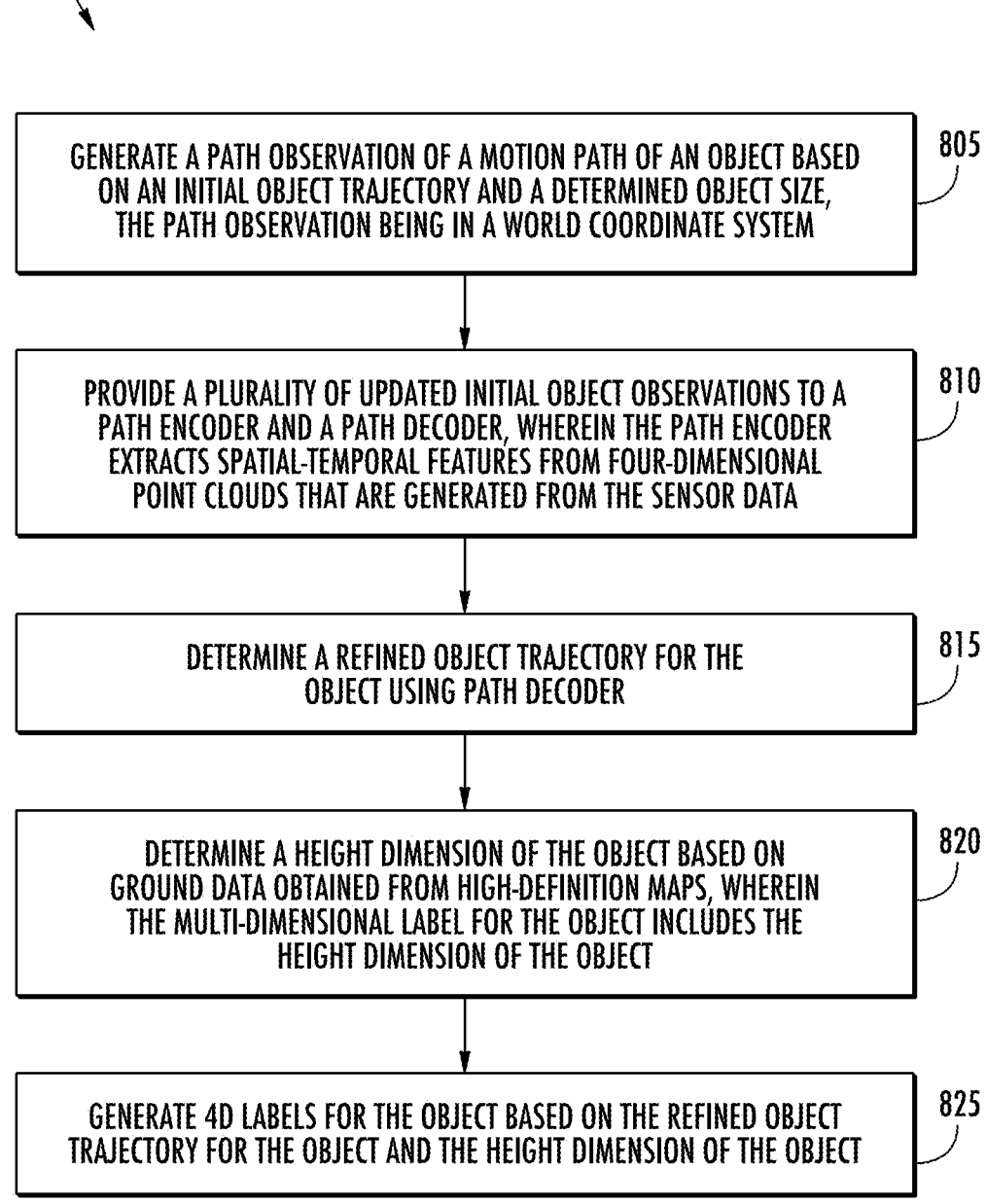

GENERATE A PATH OBSERVATION OF A MOTION PATH OF AN OBJECT BASED ON AN INITIAL OBJECT TRAJECTORY AND A DETERMINED OBJECT SIZE, THE PATH OBSERVATION BEING IN A WORLD COORDINATE SYSTEM ⌐ 805

PROVIDE A PLURALITY OF UPDATED INITIAL OBJECT OBSERVATIONS TO A PATH ENCODER AND A PATH DECODER, WHEREIN THE PATH ENCODER EXTRACTS SPATIAL-TEMPORAL FEATURES FROM FOUR-DIMENSIONAL POINT CLOUDS THAT ARE GENERATED FROM THE SENSOR DATA ⌐ 810

DETERMINE A REFINED OBJECT TRAJECTORY FOR THE OBJECT USING PATH DECODER ⌐ 815

DETERMINE A HEIGHT DIMENSION OF THE OBJECT BASED ON GROUND DATA OBTAINED FROM HIGH-DEFINITION MAPS, WHEREIN THE MULTI-DIMENSIONAL LABEL FOR THE OBJECT INCLUDES THE HEIGHT DIMENSION OF THE OBJECT ⌐ 820

GENERATE 4D LABELS FOR THE OBJECT BASED ON THE REFINED OBJECT TRAJECTORY FOR THE OBJECT AND THE HEIGHT DIMENSION OF THE OBJECT ⌐ 825

*FIG. 8*

AUTOMATIC ANNOTATION OF OBJECT TRAJECTORIES IN MULTIPLE DIMENSIONS

RELATED APPLICATION

The present application is a continuation of U.S. Non-Provisional patent application Ser. No. 17/528,559 having a filing date of Nov. 17, 2021, which is based on and claims the benefit of U.S. Provisional Patent Application No. 63/114,785 having a filing date of Nov. 17, 2020. Applicant claims priority to and the benefit of each of such applications and incorporates all such applications herein by reference in its entirety.

BACKGROUND

An autonomous platform can process data to perceive an environment through which the platform can travel. For example, an autonomous vehicle can perceive its environment using a variety of sensors and identify objects around the autonomous vehicle. The autonomous vehicle can identify an appropriate path through the perceived surrounding environment and navigate along the path with minimal or no human input.

SUMMARY

Aspects and advantages of embodiments of the present disclosure will be set forth in part in the following description, or may be learned from the description, or may be learned through practice of the embodiments.

The disclosed technology is directed to automatic annotation techniques, using a computing system (e.g., an annotation system), to generate accurate object trajectories in multiple dimensions from obtained sensor data. For example, four-dimensional (4D) annotation can be determined in space-time dimensions consisting of three dimensions of space (3D) and one dimension of time. The sensor data can include Light Detection and Ranging (LiDAR) point cloud data. The annotation system automates the 4D labeling of objects by: (1) determining the object size in 3D that is fixed through time for objects, and (2) determining the object's pose through time to generate a refined trajectory (e.g., motion path) of the object. Instead of generating a series of labels in one iteration as done in conventional systems, the disclosed annotation system adopts an iterative refinement process where object detections are tracked and updated through time. As a result, by determining a fixed object size and refining (e.g., smoothing) the trajectory of the object (e.g., motion path of the object) in an iterative refinement process, the annotation system produces higher quality 4D labels in comparison to conventional systems. Some of the improvements are achieved by exploiting the aggregated observations and motion cues over the entire trajectory.

Techniques for generating a motion plan for an autonomous vehicle (AV) are described herein. In some instances, one or more sensors (e.g., a LiDAR sensor) coupled to the AV generates sensor data (e.g., raw sensor data) that is sequential over a period of time. For example, the raw sensor data includes 3D measurements across time of a scene captured by a LiDAR sensor on top of a self-driving vehicle. Then, the annotation system generates the initial object trajectory using the sensor data (e.g., raw sensor data). In some instances, the annotation system generates the initial object trajectory by using a pre-trained 3D object detector and object tracker. The initial object trajectory can be a noisy aggregation of LiDAR points over the entire trajectory. The initial object trajectory can include a plurality of initial object observations respectively associated with parameters including an object size of the object, an initial object pose of the object, and a timestamp. The timestamp can correspond to the time that the raw sensor data was captured by the one or more sensors. Each of the initial object observations can have a different object size for the object. Additionally, the annotation system, using an object size reasoning model, determines (e.g., predicts) a fixed value (e.g., a single set of bounding box dimensions) for the object size of the object. Moreover, the annotation system, using a trajectory refinement model, exploits the fixed value of the object size and employs a spatial-temporal encoder-decoder to refine the trajectory of the object. The annotation system generates a refined object trajectory having a plurality of refined object observations respectively including an updated object pose of the object for the plurality of refined object observations. Subsequently, the annotation system generates a multi-dimensional label for the object based on the refined object trajectory. The annotation system can determine a motion path for the object (e.g., other vehicles in the environment) based on the multi-dimensional label for the object. Subsequently, a control system of the AV can generate a motion plan of the AV based on the multi-dimensional label for the object. In some instances, the control system of the AV can generate a motion plan of the AV based on the motion path of the object. In some instances, the motion plan of the vehicle can be optimized based on the refined trajectory of the object.

Aspects of the present disclosure improve the performance of an autonomous vehicle (AV) by generating a motion plan for the AV that is based on automatically generated labels for objects around the AV. Additionally, techniques describe herein can provide several technical improvements to simulation, robotics, and autonomous vehicle technology. To help improve the performance of a robotic platform, such as an autonomous vehicle, the technology of the present disclosure can improve the motion of a robot by accurately determining the size and trajectory of objects around the robot. With regards to improvements in model training, such as 4D automatic label generation, the techniques described herein show reduction of human annotation efforts on a large-scale driving dataset. With regards to improvements in model inference, such as using a model trained with the 4D labels for online AV object detection and motion forecasting, the techniques described herein can improve the accuracy of the object detection, improve the accuracy of the object motion forecasting, optimize the trajectory of the AV, reducing energy consumption by optimizing the motion plan of the AV, improving drivability of the AV by reducing the jerkiness of the AV (e.g., drastic change in acceleration), reduce the likelihood of hard stops, and other vehicle driving parameters.

Example systems and methods according to aspects of the present disclosure offer various improvements over prior approaches. For example, conventional systems typically rely on large amounts of high-quality labels to achieve good performance, which can be time intensive work by human annotators. For example, the exact extent, size, and pose of an object are often unclear from a single observation. A pose of an object can be the position and orientation of the object relative to some coordinate system. Therefore, human annotators have to detect each object in each frame while considering the additional evidence over the trajectory sequence to help accurately estimate the size and pose of each object.

Additionally, conventional object detectors using sensor data often have difficulty estimating the full extent of the object due to partial observation and occlusion. For example, observations of vehicles in 3D point cloud data can show a subset of the corners and sides of a vehicle, while other corners and sides of the vehicle may be hidden due to occlusion.

Moreover, conventional object trackers can output noisy trajectories of the object, partly due to the trajectory of the object being determined based on a snapshot in time. For example, conventional systems usually generate a series of labels in one iteration. However, movement of various objects (e.g., traffic agents) can follows certain physical constraints, especially for vehicles, which can be leveraged to determine more accurate trajectory determinations.

In order to reduce the amount of effort required from human annotators, example implementations of systems and methods according to the present disclosure provide for automatic object detectors and object trajectory predictors capable of accurately determining the size and shape of an object in an environment, and also generating smooth and natural trajectories of the object. A robot can rely on machine-learned models to determine an accurate size, shape, and trajectory of an object around the robot in order to generate a motion plan for the robot. Aspects of the disclosed technology provide better machine-learned training techniques that help to optimize the motion plan of a robot leading to more effective operation and motion of the robot.

As an example, aspects of the present disclosure describe a method for generating a motion plan for an autonomous vehicle (AV). The motion plan of the AV can be generated based on a multi-dimensional label for an object near the AV. The method includes obtaining sensor data from one or more sensors coupled (e.g., attached) to the AV. The sensor data being sequential over a period of time. The method further includes generating an initial object trajectory for an object, using the sensor data. The initial object trajectory includes a plurality of initial object observations respectively associated with parameters including an object size of the object, an initial object pose of the object, and a timestamp. Additionally, the method includes determining a fixed value for the object size of the object based on the sensor data and the plurality of initial object observations. Moreover, the method includes generating an updated initial object trajectory including a plurality of updated initial object observations. The object size in the plurality of updated initial object observations corresponds to the fixed value. Furthermore, the method includes determining, based on the sensor data and the updated initial object trajectory, a refined object trajectory including a plurality of refined object observations respectively including an updated object pose of the object for the plurality of refined object observations. Subsequently, the method includes generating a multi-dimensional label for the object based on the refined object trajectory.

In some implementations, the method can further include generating a motion plan for the AV based on the multi-dimensional label, where the AV is controlled using the motion plan.

In some implementations, the multi-dimensional label for the object includes a bounding box defined relative to a plurality of spatial dimensions and a time dimension corresponding to the period of time.

In some implementations, the initial object pose includes a center position of the object at the timestamp and an orientation of the object at the timestamp. In other implementations, the initial object pose includes a corner position of the object at the timestamp and an orientation of the object at the timestamp.

In some implementations, the one or more sensors includes a LiDAR sensor, and the sensor data includes a series of sequential point clouds of LiDAR data.

In some implementations, the object is one of a vehicle, a pedestrian, a bicycle, or a scooter.

In some instances, the initial object pose includes a center position of the object at the timestamp and an orientation of the object at the timestamp. In some implementations, determining the fixed value for the object size includes converting the sensor data into an object coordinate system by aligning the center position of the object and the orientation of the object over multiple timestamps in the plurality of initial object observations. In some other implementations, determining the fixed value for the object size includes converting the sensor data into an object coordinate system by aligning the corner position of the object and the orientation of the object over multiple timestamps in the plurality of initial object observations.

In some implementations, determining the fixed value for the object size includes providing the plurality of initial object observations to an object encoder and an object decoder. Additionally, the object encoder extracts high-resolution features of the object in a bird's-eye-view (BEV) space in order to determine the fixed value.

In some implementations, determining the refined object trajectory includes converting the sensor data into a world coordinate system. Additionally, by converting the sensor data into a world coordinate system, a motion of the object can be determined independent of a movement associated with the AV.

In some implementations, determining the refined object trajectory includes providing the plurality of updated initial object observations to a path encoder and a path decoder. Additionally, the path encoder can extract spatial-temporal features from four-dimensional point clouds that are generated from the sensor data.

In some implementations, the method further includes determining a height dimension of the object based on ground data obtained from high-definition maps. The multi-dimensional label for the object can include the height dimension of the object.

In some implementations, the method further includes training a 4D label generation model using the multi-dimensional label for the object. Additionally, the method further includes detecting a second object around the AV using the sensor data. Moreover, the method further includes determining, using the trained 4D label generation model, a multi-dimensional label for the second object.

As another example, aspects of the present disclosure describe an autonomous vehicle (AV) control system of an AV. The AV control system can include one or more machine-learned models that have been learned via performance of machine learning algorithms on one or more training examples including motion path data. The motion path data can be generated by performance of operations, the operations include obtaining, from one or more sensors coupled (e.g., attached) to the AV, sensor data. The sensor data can be sequential over a period of time. Additionally, the operations further include generating, using the sensor data, an initial object trajectory for an object. The initial object trajectory includes a plurality of initial object observations respectively associated with parameters including an object size of the object, an initial object pose of the object, and a timestamp. Additionally, the operations include processing, using the sensor data, the plurality of initial object observations to determine a fixed value for the object size of the object. Moreover, the operations include updating, based on the fixed value for the object size of the object, the initial object trajectory including the plurality of initial object observations to generate an updated initial object trajectory including a plurality of updated initial object observations. The object size in the plurality of updated initial object observations corresponds to the fixed value. Furthermore, the operations include processing, using the sensor data, the updated initial object trajectory to determine a refined object trajectory including a plurality of refined object observations respectively including an updated object pose of the object for the plurality of refined object observations. The operations also include generating a multi-dimensional label for the object based on the refined object trajectory, wherein the motion path for the AV is based on the multi-dimensional label for the object.

As yet another example, aspects of the present disclosure describe a computing system including one or more processors and one or more computer-readable media. The one or more computer-readable media store instructions that when executed by the one or more processors cause the computing system to perform operations. The operations include obtaining sensor data from one or more sensors coupled (e.g., attached) to the AV and generating an initial object trajectory for an object using the sensor data. The sensor data can be sequential over a period of time. The initial object trajectory includes a plurality of initial object observations respectively associated with parameters including an object size of the object, an initial object pose of the object, and a timestamp. Additionally, the operations include processing, using the sensor data, the plurality of initial object observations to determine a fixed value for the object size of the object. Moreover, the operations include updating, based on the fixed value for the object size of the object, the initial object trajectory including the plurality of initial object observations to generate an updated initial object trajectory including a plurality of updated initial object observations. The object size in the plurality of updated initial object observations corresponds to the fixed value. Furthermore, the operations include processing, using the sensor data, the updated initial object trajectory to determine a refined object trajectory including a plurality of refined object observations respectively including an updated object pose of the object for the plurality of refined object observations. The operations can also include generating a multi-dimensional label for the object based on the refined object trajectory.

In some implementations, the motion plan for the AV is generated by the computing system or control system is based on the multi-dimensional label. Additionally, the AV can be controlled by the computing system or control system using the motion plan.

Other example aspects of the present disclosure are directed to other systems, methods, vehicles, apparatuses, tangible non-transitory computer-readable media, and devices for generating data (e.g., hybrid graphs), training models, and performing other functions (e.g., predicting interactions between objects, predicting a trajectory or motion of an object) described herein. These and other features, aspects and advantages of various implementations will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which refers to the appended figures, in which:

FIG. 6 depicts a flowchart of a method for automatically annotating objects in an environment, according to aspects of the present disclosure;

FIG. 7 depicts a flowchart of a method for determining an object size for an object, according to aspects of the present disclosure;

FIG. 8 depicts a flowchart of a method for generating a refined object trajectory, according to aspects of the present disclosure.

DETAILED DESCRIPTION

Figure 1:
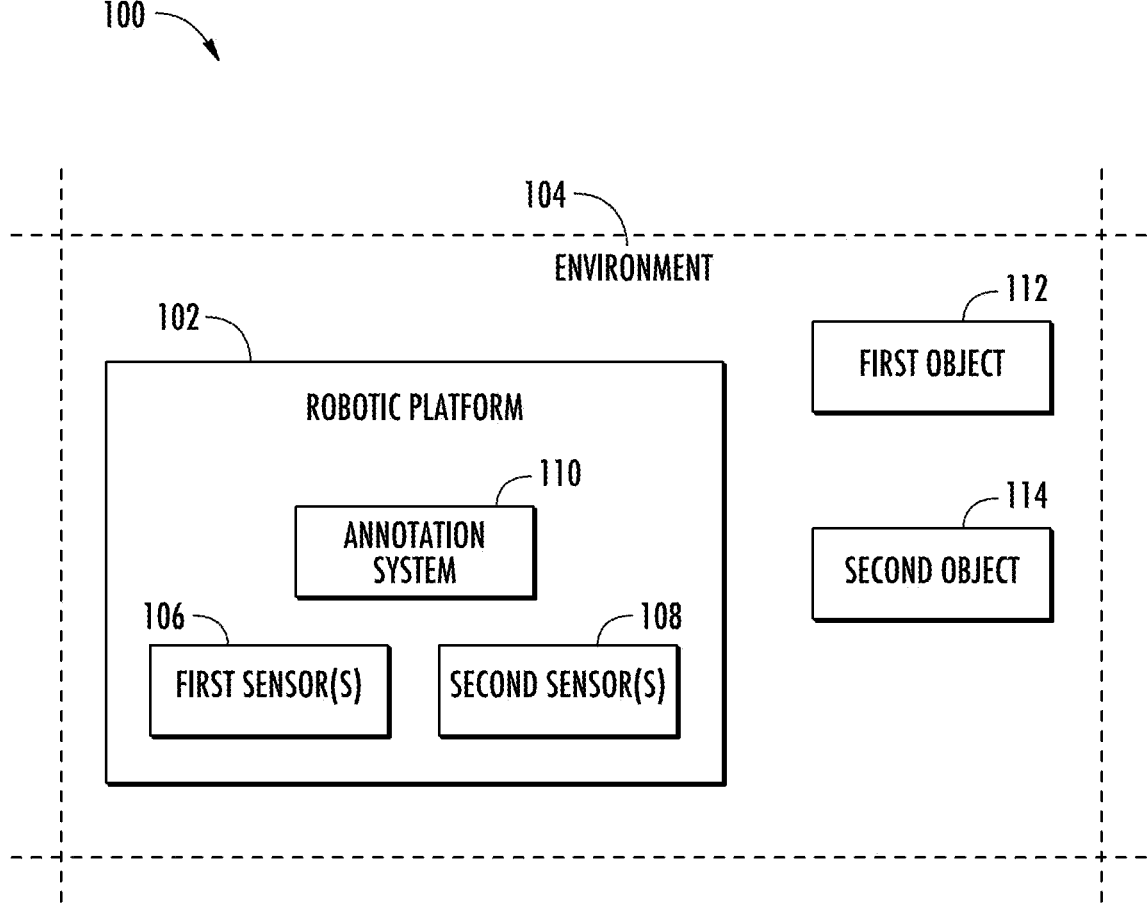
FIG. 1 depicts a block diagram of a computing platform, according to some implementations of the present disclosure.

The following describes the technology of this disclosure within the context of an autonomous vehicle for example purposes only. As described herein, the technology described herein is not limited to an autonomous vehicle and can be implemented within other robotic and computing systems. With reference now to FIGS. 1-9, example embodiments of the present disclosure will be discussed in further detail.

Aspects of the present disclosure describe automatic annotation techniques to generate accurate object trajectories in 3D space over time (i.e., 4D object labels) from LiDAR point clouds. The annotation techniques automate the 4D labeling of objects by determining the object size in 3D that is fixed through time for objects and determining the object's pose through time to generate the motion path of the object. As a result, by determining a fixed object size and smoothing the motion path in an iterative refinement process, the annotation system produces higher quality 4D labels in comparison to conventional systems.

Aspects of the present disclosure provide several technical improvements to simulation, robotics, and autonomous vehicle technology. To help improve the performance of a robotic platform, such as an autonomous vehicle, the technology of the present disclosure can improve the motion of a robot by accurately determining the size and trajectory of objects around the robot. With regards to improvements in model training, such as 4D automatic label generation, the techniques described herein show a reduction of human annotation efforts on a large-scale driving dataset. With regards to improvements in model training, such as 4D automatic label generation, the techniques described herein show reduction of human annotation efforts on a large-scale driving dataset. With regards to improvements in model inference, such as using a model trained with the 4D labels for online AV object detection and motion forecasting, the techniques described herein can improve the accuracy of the object detection, improve the accuracy of the object motion forecasting, optimize the trajectory of the AV, reduce energy consumption by optimizing the motion plan of the AV, improve drivability of the AV by reducing the jerkiness of the AV (e.g., drastic change in acceleration), reduce the likelihood of hard stops, and other vehicle driving parameters.

The annotation system is able to accurately perceive a scene and predict how the scene can evolve in the near future. Prediction of the evolution of a scene is important for the subsequent motion planner of a robot (e.g., AV) to plan a safe and comfortable maneuver towards its goal. In recent years, the adoption of deep learning has resulted in great advances in 3D perception and motion forecasting. However, as previously mentioned, the deep learning approach requires a large amounts of labeled data. For example, to have proper perception and motion forecasting, the 3D bounding boxes over time (e.g., space-time bounding box) need to be accurate. These space-time bounding box annotations can be referred as 4D labels. Unlike annotations in the image domain, creation of 4D labels using LiDAR points is a complex task due to the sparsity of the observations. The exact extent, size, and pose of an object are often unclear from a single observation. Therefore, human annotators have to detect each object in each frame while considering the additional evidence over the trajectory sequence to help accurately estimate the size and location of each object. The potential inaccuracies are exacerbated by the ambiguity in visualizing 3D information on a 2D display for the annotator and also retrieving noisy sensor data (e.g., 3D input).

As such, the process of creating 4D labels can be extremely tedious, time consuming and expensive. For example, more than 10 hours may be needed to accurately annotate a 25-second scene at 10 Hz. Therefore, there is great value in automating label creation or in creating human-in-the-loop refinement systems that correct automatically created labels. In contrast, conventional systems may only use sensor data from a single interval of time (e.g., timeframe) or past measurements from a very short history. The techniques described herein produce space-time bounding boxes that are consistent over time in size and construct a smooth, accurate, and realistic trajectory. Additionally, an auto-labeling model described herein holistically considers the LiDAR points collected over the entire trajectory of an object by incorporating reasoning from the annotation process by humans. The human input can be used to train and improve the auto-labeling model. In particular, a focus on the 4D annotation of vehicles is made, as they are often the most numerous traffic participants in a scene and would result in the greatest savings in cost.

The annotation system uses a pipeline of object detection and discrete association as a cheap (e.g., computationally inexpensive) but noisy initialization to isolate the trajectories of individual vehicles. Then, the technique applies a multi-phase implementation (e.g., object size determinator, object trajectory predictor) network. The object size determinator includes an object size reasoning model that predicts a single set of bounding box dimensions using the noisy aggregation of LiDAR points over the entire trajectory. The second branch, which can be the object trajectory predictor, can include a trajectory refinement model which exploits the size estimate from the object size reasoning model and a spatial-temporal encoder-decoder to refine the motion path of the vehicle.

Additionally, by using a dataset with high accurate ground truth annotations, the technique can validate the performance of the high precision automatic labeling pipeline. Therefore, the effectiveness of the model is demonstrated on a large-scale driving dataset with annotations of much higher quality than available datasets. For example, compared with the noisy initialization received in the object size determination, the object size reasoning model can improve the number of precise bounding boxes (i.e., with Intersection-over-Union (IoU) greater than 0.9) by 36%, while the baseline using offline detection and tracking only brings a relative gain of less than 2%.

The annotation system, which include an automatic labeling process, can recover 3D object trajectories from sequential point clouds in the context of self-driving. While conventional systems focused on single-frame object labels either in 2D or 3D, the annotation system generate temporally consistent (e.g., consistent over time) object labels in 3D space (dubbed 4D labels). As vehicles comprise a large portion of dynamic traffic participants in a scene, the annotation system can automatically annotate vehicle. Additionally, the annotation system can annotate other class of objects, such as, but not limited to scooters, pedestrians, and bicycles.

FIG. 1 depicts a block diagram of an example operational scenario 100 according to example implementations of the present disclosure. The operational scenario 100 includes a robotic platform 102, an annotation system 110, a first object 112, a second object 114, and an environment 104. The robotic platform 102, for example, can operate within the environment 104 using a control algorithm of the robot (e.g., AV). The control algorithm can determine a motion plan for the robot. The annotation system 110 can optimize the motion plan to improve performance of the robot. The environment 104 can be external to the robotic platform 102. The environment 104 can include an indoor environment (e.g., within one or more facilities) or an outdoor environment.

The first object 112 and the second object 114 can be within the environment 104. In some implementations, the first object 112 or the second object 114 can be outside the environment (e.g., more than a threshold distance from the robotic platform). The first object 112 or the second object 114 can be a dynamic object such as another vehicle, a bicycle, a pedestrian, and so on. The first object 112 can have a motion trajectory over a period of time that corresponds to a motion path of the first object 112. Similarly, the second object 114 can have a motion trajectory over a period of time that corresponds to a motion path of the second object 114. Additionally, in some instances, the first object 112 or the second object 114 can also be a static object, such as parked car or a stationary object (e.g., fire hydrant, pole).

The robotic platform 102 can include one or more sensor(s) 106, 108. The one or more sensors 106, 108 can be configured to generate or store data descriptive of the environment 104 (e.g., one or more static or dynamic objects therein). The sensors 106, 108 can be configured to obtain object data (e.g., point cloud data). For example, the object data can have position data, velocity data, orientation data for the first object 112 and the second object 114. The sensors 106, 108 can be configured to obtain traffic element data associated with a traffic element. For example, the traffic element data may include data describing locations of traffic elements (e.g., stop signs or traffic lights) within the environment 104. The locations may be associated with a map of the environment.

The sensor(s) 106, 108 can include one or more Light Detection and Ranging (LiDAR) systems, one or more Radio Detection and Ranging (RADAR) systems, one or more cameras (e.g., visible spectrum cameras or infrared cameras), one or more sonar systems, one or more motion sensors, or other types of image capture devices or sensors. The sensor(s) 106, 108 can include multiple sensors of different types. For instance, the sensor(s) 106, 108 can include one or more first sensor(s) 106 and one or more second sensor(s) 108. The first sensor(s) 106 can include a different type of sensor than the second sensor(s) 108. By way of example, the first sensor(s) 106 can include one or more imaging device(s) (e.g., cameras, etc.), whereas the second sensor(s) 108 can include one or more depth measuring device(s) (e.g., LiDAR device, etc.).

The robotic platform 102 can include any type of platform configured to operate with the environment 104. For example, the robotic platform 102 can include one or more different type(s) of vehicle(s) configured to perceive and operate within the environment 104. The vehicles, for example, can include one or more autonomous vehicle(s) such as, for example, one or more autonomous trucks. By way of example, the robotic platform 102 can include an autonomous truck including an autonomous tractor coupled to a cargo trailer. In addition, or alternatively, the robotic platform 102 can include any other type of vehicle such as one or more aerial vehicles, ground-based vehicles, water-based vehicles, space-based vehicles, etc.

Figure 2A:
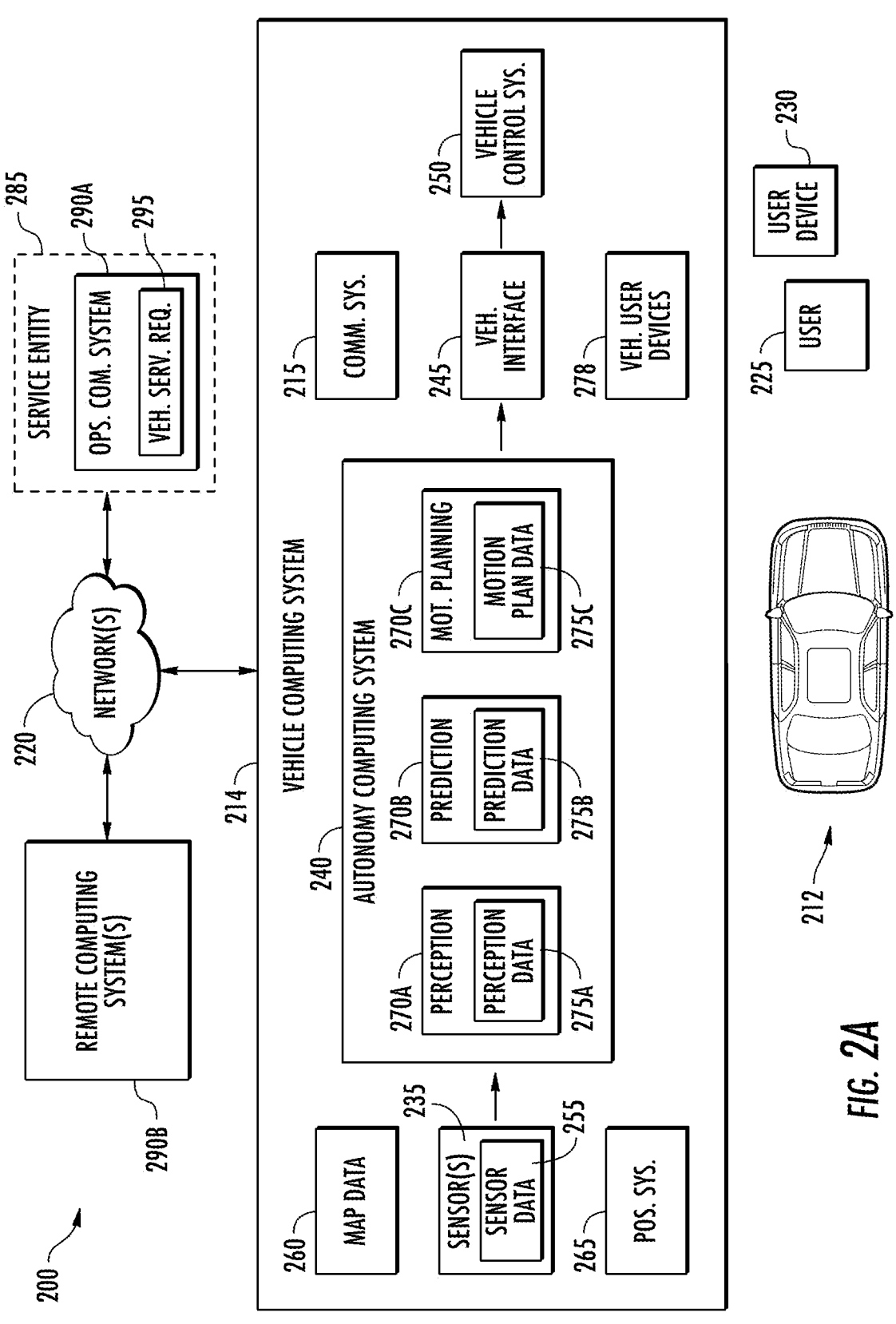
FIG. 2A depicts a block diagram of an autonomy computing system, according to some implementations of the present disclosure.

FIG. 2A depicts an overview of an example system 200 of the robotic platform (e.g., robotic platform 105 of FIG. 1) as an autonomous vehicle according to example implementations of the present disclosure. More particularly, FIG. 2A illustrates a vehicle 212 including various systems and devices configured to control the operation of the vehicle 212. For example, the vehicle 212 can include an onboard vehicle computing system 214 (e.g., located on or within the autonomous vehicle, etc.) that is configured to operate the vehicle 212. Generally, the vehicle computing system 214 can obtain sensor data 255 from a sensor system (e.g., sensor(s) 115, 120 of FIG. 1 and/or sensors 235 of FIG. 2A) onboard the vehicle 212, attempt to comprehend the vehicle's surrounding environment by performing various processing techniques on the sensor data 255, and generate an appropriate motion plan through the vehicle's surrounding environment (e.g., environment 104 of FIG. 1).

The vehicle 212 incorporating the vehicle computing system 214 can be various types of vehicles. For instance, the vehicle 212 can be an autonomous vehicle. The vehicle 212 can be a ground-based autonomous vehicle (e.g., car, truck, bus, etc.). The vehicle 212 can be an air-based autonomous vehicle (e.g., airplane, helicopter, vertical take-off and lift (VTOL) aircraft, etc.). The vehicle 212 can be a lightweight elective vehicle (e.g., bicycle, scooter, etc.). The vehicle 212 can be another type of vehicle (e.g., watercraft, etc.). The vehicle 212 can drive, navigate, operate, etc. with minimal or no interaction from a human operator (e.g., driver, pilot, etc.). In some implementations, a human operator can be omitted from the vehicle 212 (or also omitted from remote control of the vehicle 212). In some implementations, a human operator can be included in the vehicle 212.

The vehicle 212 can be configured to operate in a plurality of operating modes. The vehicle 212 can be configured to operate in a fully autonomous (e.g., self-driving) operating mode in which the vehicle 212 is controllable without user input (e.g., can drive and navigate with no input from a human operator present in the vehicle 212 or remote from the vehicle 212). The vehicle 212 can operate in a semi-autonomous operating mode in which the vehicle 212 can operate with some input from a human operator present in the vehicle 212 (or a human operator that is remote from the vehicle 212). The vehicle 212 can enter into a manual operating mode in which the vehicle 212 is fully controllable by a human operator (e.g., human driver, pilot, etc.) and can be prohibited or disabled (e.g., temporary, permanently, etc.) from performing autonomous navigation (e.g., autonomous driving, flying, etc.). The vehicle 212 can be configured to operate in other modes such as, for example, park or sleep modes (e.g., for use between tasks/actions such as waiting to provide a vehicle service, recharging, etc.). In some implementations, the vehicle 212 can implement vehicle operating assistance technology (e.g., collision mitigation system, power assist steering, etc.), for example, to help assist the human operator of the vehicle 212 (e.g., while in a manual mode, etc.).

To help maintain and switch between operating modes, the vehicle computing system 214 can store data indicative of the operating modes of the vehicle 212 in a memory onboard the vehicle 212. For example, the operating modes can be defined by an operating mode data structure (e.g., rule, list, table, etc.) that indicates one or more operating parameters for the vehicle 212, while in the particular operating mode. For example, an operating mode data structure can indicate that the vehicle 212 is to autonomously plan its motion when in the fully autonomous operating mode. The vehicle computing system 214 can access the memory when implementing an operating mode.

The operating mode of the vehicle 212 can be adjusted in a variety of manners. For example, the operating mode of the vehicle 212 can be selected remotely, off-board the vehicle 212. For example, a remote computing system (e.g., of a vehicle provider or service entity associated with the vehicle 212) can communicate data to the vehicle 212 instructing the vehicle 212 to enter into, exit from, maintain, etc. an operating mode. By way of example, such data can instruct the vehicle 212 to enter into the fully autonomous operating mode.

In some implementations, the operating mode of the vehicle 212 can be set onboard or near the vehicle 212. For example, the vehicle computing system 214 can automatically determine when and where the vehicle 212 is to enter, change, maintain, etc. a particular operating mode (e.g., without user input). Additionally, or alternatively, the operating mode of the vehicle 212 can be manually selected through one or more interfaces located onboard the vehicle 212 (e.g., key switch, button, etc.) or associated with a computing device within a certain distance to the vehicle 212 (e.g., a tablet operated by authorized personnel located near the vehicle 212 and connected by wire or within a wireless communication range). In some implementations, the operating mode of the vehicle 212 can be adjusted by manipulating a series of interfaces in a particular order to cause the vehicle 212 to enter into a particular operating mode.

The operations computing system 290A can include multiple components for performing various operations and functions. For example, the operations computing system 290A can be configured to monitor and communicate with the vehicle 212 or its users to coordinate a vehicle service provided by the vehicle 212. To do so, the operations computing system 290A can communicate with the one or more remote computing system(s) 290B or the vehicle 212 through one or more communications network(s) including the network(s) 220. The network(s) 220 can send or receive signals (e.g., electronic signals) or data (e.g., data from a computing device) and include any combination of various wired (e.g., twisted pair cable) or wireless communication mechanisms (e.g., cellular, wireless, satellite, microwave, and radio frequency) or any desired network topology (or topologies). For example, the network 220 can include a local area network (e.g., intranet), wide area network (e.g., the Internet), wireless LAN network (e.g., through Wi-Fi), cellular network, a SATCOM network, VHF network, a HF network, a WiMAX based network, or any other suitable communications network (or combination thereof) for transmitting data to or from the vehicle 212. Additionally, in some implementations, some or all parts of the disclosed annotation system can be part of the one more operations computing system(s) 290A.

Each of the one or more remote computing system(s) 290B or the operations computing system 290A can include one or more processors and one or more memory devices. The one or more memory devices can be used to store instructions that when executed by the one or more processors of the one or more remote computing system(s) 290B or operations computing system 290A cause the one or more processors to perform operations or functions including operations or functions associated with the vehicle 212 including sending or receiving data or signals to or from the vehicle 212, monitoring the state of the vehicle 212, or controlling the vehicle 212. The one or more remote computing system(s) 290B can communicate (e.g., exchange data or signals) with one or more devices including the operations computing system 290A and the vehicle 212 through the network 220. Additionally, in some implementations, some or all parts of the disclosed annotation system can be part of the one more remote computing system(s) 290B.

The one or more remote computing system(s) 290B can include one or more computing devices such as, for example, one or more operator devices associated with one or more vehicle providers (e.g., providing vehicles for use by the service entity), user devices associated with one or more vehicle passengers, developer devices associated with one or more vehicle developers (e.g., a laptop/tablet computer configured to access computer software of the vehicle computing system 214), etc. One or more of the devices can receive input instructions from a user or exchange signals or data with an item or other computing device or computing system (e.g., the operations computing system 290A). Further, the one or more remote computing system(s) 290B can be used to determine or modify one or more states of the vehicle 212 including a location (e.g., a latitude and longitude), a velocity, an acceleration, a trajectory, a heading, or a path of the vehicle 212 based in part on signals or data exchanged with the vehicle 212. In some implementations, the operations computing system 290A can include the one or more remote computing system(s) 290B.

The vehicle computing system 214 can include one or more computing devices located onboard the vehicle 212. For example, the computing device(s) can be located on or within the vehicle 212. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 212 (e.g., its computing system, one or more processors, etc.) to perform operations and functions, such as those described herein for collecting training data, communicating with other computing systems, etc.

The vehicle 212 can include a communications system 215 configured to allow the vehicle computing system 214 (and its computing device(s)) to communicate with other computing devices. The communications system 215 can include any suitable components for interfacing with one or more network(s) 220, including, for example, transmitters, receivers, ports, controllers, antennas, or other suitable components that can help facilitate communication. In some implementations, the communications system 215 can include a plurality of components (e.g., antennas, transmitters, or receivers) that allow it to implement and utilize multiple-input, multiple-output (MIMO) technology and communication techniques.

The vehicle computing system 214 can use the communications system 215 to communicate with one or more computing device(s) that are remote from the vehicle 212 over one or more networks 220 (e.g., through one or more wireless signal connections). The network(s) 220 can exchange (send or receive) signals (e.g., electronic signals), data (e.g., data from a computing device), or other information and include any combination of various wired (e.g., twisted pair cable) or wireless communication mechanisms (e.g., cellular, wireless, satellite, microwave, and radio frequency) or any desired network topology (or topologies). For example, the network(s) 220 can include a local area network (e.g., intranet), wide area network (e.g., Internet), wireless LAN network (e.g., through Wi-Fi), cellular network, a SATCOM network, VHF network, a HF network, a WiMAX based network, or any other suitable communication network (or combination thereof) for transmitting data to or from the vehicle 212 or among computing systems.

As shown in FIG. 2A, the vehicle computing system 214 can include the one or more sensors 235, the autonomy computing system 240, the vehicle interface 245, the one or more vehicle control systems 250, and other systems, as described herein. One or more of these systems can be configured to communicate with one another through one or more communication channels. The communication channel(s) can include one or more data buses (e.g., controller area network (CAN)), on-board diagnostics connector (e.g., OBD-II), or a combination of wired or wireless communication links. The onboard systems can send or receive data, messages, signals, etc. amongst one another through the communication channel(s).

In some implementations, the sensor(s) 235 can include at least two different types of sensor(s). For instance, the sensor(s) 235 can include at least one first sensor (e.g., the first sensor(s) 115, etc.) and at least one second sensor (e.g., the second sensor(s) 120, etc.). The at least one first sensor can be a different type of sensor than the at least one second sensor. For example, the at least one first sensor can include one or more image capturing device(s) (e.g., one or more cameras, RGB cameras, etc.). In addition, or alternatively, the at least one second sensor can include one or more depth capturing device(s) (e.g., LiDAR sensor, etc.). The at least two different types of sensor(s) can obtain object data, traffic element data, or multi-modal sensor data indicative of one or more static or dynamic objects within an environment of the vehicle 212. As described herein with reference to the remaining figures, the sensor data can be provided to the operational computing system 290A for use in training one or more machine-learned algorithms described in FIGS. 6-8.

The sensor(s) 235 can be configured to acquire sensor data 255. The sensor(s) 235 can be external sensors configured to acquire external sensor data. This can include sensor data associated with the surrounding environment of the vehicle 212. The surrounding environment of the vehicle 212 can include/be represented in the field of view of the sensor(s) 235. For instance, the sensor(s) 235 can acquire image or other data of the environment outside of the vehicle 212 and within a range or field of view of one or more of the sensor(s) 235. This can include different types of sensor data acquired by the sensor(s) 235 such as, for example, data from one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), or other types of imaging capture devices or sensors. The one or more sensors can be located on various parts of the vehicle 212 including a front side, rear side, left side, right side, top, or bottom of the vehicle 212. The sensor data 255 can include image data (e.g., 2D camera data, video data, etc.), RADAR data, LIDAR data (e.g., 3D point cloud data, etc.), audio data, or other types of data. The vehicle 212 can also include other sensors configured to acquire data associated with the vehicle 212. For example, the vehicle 212 can include inertial measurement unit(s), wheel odometry devices, or other sensors.

The sensor data 255 can be indicative of one or more objects within the surrounding environment of the vehicle 212. The object(s) can include, for example, vehicles, pedestrians, bicycles, or other objects. The object(s) can be located in front of, to the rear of, to the side of, above, below the vehicle 212, etc. The sensor data 255 can be indicative of locations associated with the object(s) within the surrounding environment of the vehicle 212 at one or more times. The object(s) can be static objects (e.g., not in motion) or dynamic objects/actors (e.g., in motion or likely to be in motion) in the vehicle's environment. The sensor data 255 can also be indicative of the static background of the environment. The sensor(s) 235 can provide the sensor data 255 to the autonomy computing system 240, the remote computing device(s) 290B, or the operations computing system 290A.

In addition to the sensor data 255, the autonomy computing system 240 can obtain map data 260. The map data 260 can provide detailed information about the surrounding environment of the vehicle 212 or the geographic area in which the vehicle was, is, or will be located. For example, the map data 260 can provide information regarding: the identity and location of different roadways, road segments, buildings, or other items or objects (e.g., lampposts, crosswalks or curb); the location and directions of traffic lanes (e.g., the location and direction of a parking lane, a turning lane, a bicycle lane, or other lanes within a particular roadway or other travel way or one or more boundary markings associated therewith); traffic control data (e.g., the location and instructions of signage, traffic lights, or other traffic control devices); obstruction information (e.g., temporary or permanent blockages, etc.); event data (e.g., road closures/traffic rule alterations due to parades, concerts, sporting events, etc.); nominal vehicle path data (e.g., indicative of an ideal vehicle path such as along the center of a certain lane, etc.); or any other map data that provides information that assists the vehicle computing system 214 in processing, analyzing, and perceiving its surrounding environment and its relationship thereto. In some implementations, the map data 260 can include high-definition map data. In some implementations, the map data 260 can include sparse map data indicative of a limited number of environmental features (e.g., lane boundaries, etc.). In some implementations, the map data can be limited to geographic area(s) or operating domains in which the vehicle 212 (or autonomous vehicles generally) may travel (e.g., due to legal/regulatory constraints, autonomy capabilities, or other factors).

The vehicle 212 can include a positioning system 265. The positioning system 265 can determine a current position of the vehicle 212. This can help the vehicle 212 localize itself within its environment. The positioning system 265 can be any device or circuitry for analyzing the position of the vehicle 212. For example, the positioning system 265 can determine position by using one or more of inertial sensors (e.g., inertial measurement unit(s), etc.), a satellite positioning system, based on IP address, by using triangulation or proximity to network access points or other network components (e.g., cellular towers, Wi-Fi access points, etc.) or other suitable techniques. The position of the vehicle 212 can be used by various systems of the vehicle computing system 214 or provided to a remote computing system. For example, the map data 260 can provide the vehicle 212 relative positions of the elements of a surrounding environment of the vehicle 212. The vehicle 212 can identify its position within the surrounding environment (e.g., across six axes, etc.) based at least in part on the map data 260. For example, the vehicle computing system 214 can process the sensor data 255 (e.g., object data, traffic element data, LIDAR data, camera data, etc.) to match it to a map of the surrounding environment to get an understanding of the vehicle's position within that environment. Data indicative of the vehicle's position can be stored, communicated to, or otherwise obtained by the autonomy computing system 240.

The autonomy computing system 240 can perform various functions for autonomously operating the vehicle 212. For example, the autonomy computing system 240 can perform functions associated with the following systems: a perception system 270A, a prediction system 270B, and a motion planning system 270C. For example, the autonomy computing system 240 can obtain the sensor data 255 through the sensor(s) 235, process the sensor data 255 (or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, or other systems that cooperate to perceive the surrounding environment of the vehicle 212 and determine a motion plan for controlling the motion of the vehicle 212 accordingly. In some implementations, one or more of the perception system 270A, the prediction system 270B, or the motion planning system 270C can be performed by (or combined into) the same system or through shared computing resources. In some implementations, one or more of these functions can be performed through different sub-systems. As further described herein, the autonomy computing system 240 can communicate with the one or more vehicle control systems 250 to operate the vehicle 212 according to the motion plan (e.g., through the vehicle interface 245, etc.).

The vehicle computing system 214 (e.g., the autonomy computing system 240) can identify one or more objects that are within the surrounding environment of the vehicle 212 based at least in part on the sensor data 255 or the map data 260. The objects perceived within the surrounding environment can be those within the field of view of the sensor(s) 235 or predicted to be occluded from the sensor(s) 235. This can include object(s) not in motion or not predicted to move (static objects) or object(s) in motion or predicted to be in motion (dynamic objects/actors). The vehicle computing system 214 (e.g., performing perception functions, using a perception system 270A, etc.) can process the sensor data 255, the map data 260, etc. to obtain perception data 275A. The vehicle computing system 214 can generate perception data 275A that is indicative of one or more states (e.g., current, or past state(s)) of one or more objects that are within a surrounding environment of the vehicle 212. For example, the perception data 275A for each object can describe (e.g., for a given time, time period) an estimate of the object's: current or past location (also referred to as position); current or past speed/velocity; current or past acceleration; current or past heading; current or past orientation; size/footprint (e.g., as represented by a bounding shape, object highlighting, etc.); class (e.g., pedestrian class vs. vehicle class vs. bicycle class, etc.), the uncertainties associated therewith, or other state information. The perception data 275A can be an example of the sequential point clouds described in FIG. 4. The vehicle computing system 214 can utilize one or more algorithms or machine-learned model(s), such as the interaction prediction model and the graph neural network model, that are configured to identify object(s) based at least in part on the sensor data 255. This can include, for example, one or more neural networks trained to identify object(s) within the surrounding environment of the vehicle 212 and the state data associated therewith. The perception data 275A can be utilized for functions of the prediction system 270B of the autonomy computing system 240.

The vehicle computing system 214 can be configured to predict a motion of the object(s) within the surrounding environment of the vehicle 212. For instance, the vehicle computing system 214 can generate prediction data 275B associated with such object(s). The prediction data 275B can be indicative of one or more predicted future locations of each respective object. For example, the prediction system 270B can determine a predicted motion trajectory along which a respective object is predicted to travel over time. A predicted motion trajectory can be indicative of a path that the object is predicted to traverse and an associated timing with which the object is predicted to travel along the path. The predicted path can include or be made up of a plurality of way points. In some implementations, the prediction data 275B can be indicative of the speed or acceleration at which the respective object is predicted to travel along its associated predicted motion trajectory. The prediction data 275B can be an example of an initial object trajectory described in FIG. 4. The vehicle computing system 214 can utilize one or more algorithms or machine-learned model(s), such as the interaction prediction model and the graph neural network model, that are configured to predict the future motion of object(s) based at least in part on the sensor data 255, the perception data 275A, map data 260, or other data. This can include, for example, one or more neural networks trained to predict the motion of the object(s) within the surrounding environment of the vehicle 212 based at least in part on the past or current state(s) of those objects as well as the environment in which the objects are located (e.g., the lane boundary in which it is traveling). The prediction data 275B can be utilized for the motion planning functions of motion planning system 270C of the autonomy computing system 240.

The vehicle computing system 214 can determine a motion plan for the vehicle 212 based at least in part on the perception data 275A, the prediction data 275B, or other data. For example, the vehicle computing system 214 can generate motion plan data 275C indicative of a motion plan. The motion plan data 275C can be an example of a refined trajectory of an object and/or multi-dimensional (e.g., 4D) labels described in FIG. 4. The motion plan data 275C can include vehicle actions (e.g., speed(s), acceleration(s), other actions, etc.) with respect to one or more of the objects within the surrounding environment of the vehicle 212 as well as the objects' predicted movements. The motion plan can include one or more vehicle motion trajectories that indicate a path for the vehicle 212 to follow. A vehicle motion trajectory can be of a certain length or time range. A vehicle motion trajectory can be defined by one or more way points (with associated coordinates). The planned vehicle motion trajectories can indicate the path the vehicle 212 is to follow as it traverses a route from one location to another. Thus, the vehicle computing system 214 can consider a route/route data when performing the motion planning function of motion planning system 270C.

The vehicle computing system 214 can implement an optimization algorithm, machine-learned model (e.g., an interaction prediction model and the graph neural network model) that considers cost data associated with a vehicle action as well as other objective functions (e.g., cost functions based on speed limits, traffic lights, etc.), if any, to determine optimized variables that make up the motion plan. The vehicle computing system 214 can determine that the vehicle 212 can perform a certain action (e.g., pass an object, etc.) without increasing the potential risk to the vehicle 212 or violating any traffic laws (e.g., speed limits, lane boundaries, signage, etc.). For instance, the vehicle computing system 214 can evaluate the predicted motion trajectories of one or more objects during its cost data analysis to help determine an optimized vehicle trajectory through the surrounding environment. The motion planning system 270C can generate cost data associated with such trajectories. In some implementations, one or more of the predicted motion trajectories or perceived objects may not ultimately change the motion of the vehicle 212 (e.g., due to an overriding factor). In some implementations, the motion plan may define the vehicle's motion such that the vehicle 212 avoids the object(s), reduces speed to give more leeway to one or more of the object(s), proceeds cautiously, performs a stopping action, passes an object, queues behind/in front of an object, etc.

The vehicle computing system 214 can be configured to continuously update the vehicle's motion plan and corresponding planned vehicle motion trajectories. For example, in some implementations, the vehicle computing system 214 can generate new motion plan data 275C/motion plan(s) for the vehicle 212 (e.g., multiple times per second, etc.). Each new motion plan can describe a motion of the vehicle 212 over the next planning period (e.g., next several seconds, etc.). Moreover, a new motion plan may include a new planned vehicle motion trajectory. Thus, in some implementations, the vehicle computing system 214 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 212.

The vehicle computing system 214 can cause the vehicle 212 to initiate a motion control in accordance with at least a portion of the motion plan data 275C. A motion control can be an operation, action, etc. that is associated with controlling the motion of the vehicle 212. For instance, the motion plan data 275C can be provided to the vehicle control system(s) 250 of the vehicle 212. The vehicle control system(s) 250 can be associated with a vehicle interface 245 that is configured to implement a motion plan (e.g., based on a predicted trajectory of an object). The vehicle interface 245 can serve as an interface/conduit between the autonomy computing system 240 and the vehicle control systems 250 of the vehicle 212 and any electrical/mechanical controllers associated therewith. The vehicle interface 245 can, for example, translate a motion plan into instructions for the appropriate vehicle control component (e.g., acceleration control, brake control, steering control, etc.). By way of example, the vehicle interface 245 can translate a determined motion plan into instructions to adjust the steering of the vehicle 212 "X" degrees, apply a certain magnitude of braking force, increase/decrease speed, etc. The vehicle interface 245 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 212 to autonomously travel within the vehicle's surrounding environment.

The vehicle computing system 214 can store other types of data. For example, an indication, record, or other data indicative of the state of the vehicle (e.g., its location, motion trajectory, health information, etc.), the state of one or more users (e.g., passengers, operators, etc.) of the vehicle, or the state of an environment including one or more objects (e.g., the physical dimensions or appearance of the one or more objects, locations, predicted motion, etc.) can be stored locally in one or more memory devices of the vehicle 212. Additionally, the vehicle 212 can communicate data indicative of the state of the vehicle, the state of one or more passengers of the vehicle, or the state of an environment to a computing system that is remote from the vehicle 212, which can store such information in one or more memories remote from the vehicle 212. Moreover, the vehicle 212 can provide any of the data created or store onboard the vehicle 212 to another vehicle.

The vehicle computing system 214 can include the one or more vehicle user devices 230. For example, the vehicle computing system 214 can include one or more user devices with one or more display devices located onboard the vehicle 212. A display device (e.g., screen of a tablet, laptop, or smartphone) can be viewable by a user of the vehicle 212 that is located in the front of the vehicle 212 (e.g., driver's seat, front passenger seat). Additionally, or alternatively, a display device can be viewable by a user of the vehicle 212 that is located in the rear of the vehicle 212 (e.g., a back passenger seat). The user device(s) associated with the display devices can be any type of user device such as, for example, a table, mobile phone, laptop, etc. The vehicle user device(s) 230 can be configured to function as human-machine interfaces. For example, the vehicle user device(s) 230 can be configured to obtain user input, which can then be utilized by the vehicle computing system 214 or another computing system (e.g., a remote computing system, etc.). For example, a user (e.g., a passenger for transportation service, a vehicle operator, etc.) of the vehicle 212 can provide user input to adjust a destination location of the vehicle 212. The vehicle computing system 214 or another computing system can update the destination location of the vehicle 212 and the route associated therewith to reflect the change indicated by the user input.

As described herein, with reference to the remaining figures, the autonomy computing system 240 can utilize one or more machine-learned models (e.g., an interaction prediction model, a graph neural network model) to perform the functions of perception system 270A, prediction system 270B, or motion planning system 270C. The machine-learned model(s) can be previously trained through one or more machine-learned techniques. The machine-learned models can be previously trained by the one or more remote computing system(s) 290B, the operations computing system 290A, or any other device (e.g., remote servers, training computing systems, etc.) remote from or onboard the vehicle 212. For example, the one or more machine-learned models (e.g., an interaction prediction model, a graph neural network model) can be learned by a training computing system (e.g., the operations computing system 290A, etc.) over training data stored in a training database. The training data can include sequential multi-modal sensor data indicative of a plurality of environments at different interval of time (e.g., timeframe, timesteps). In some implementations, the training data can include object data, traffic element data, sequential point cloud data, initial object trajectory data, refined object trajectory data, multi-dimensional labels data, data generated by the interaction prediction model, data generated by the graph neural network model, and implementation plan associated with a trajectory of an object.

Figure 2B:
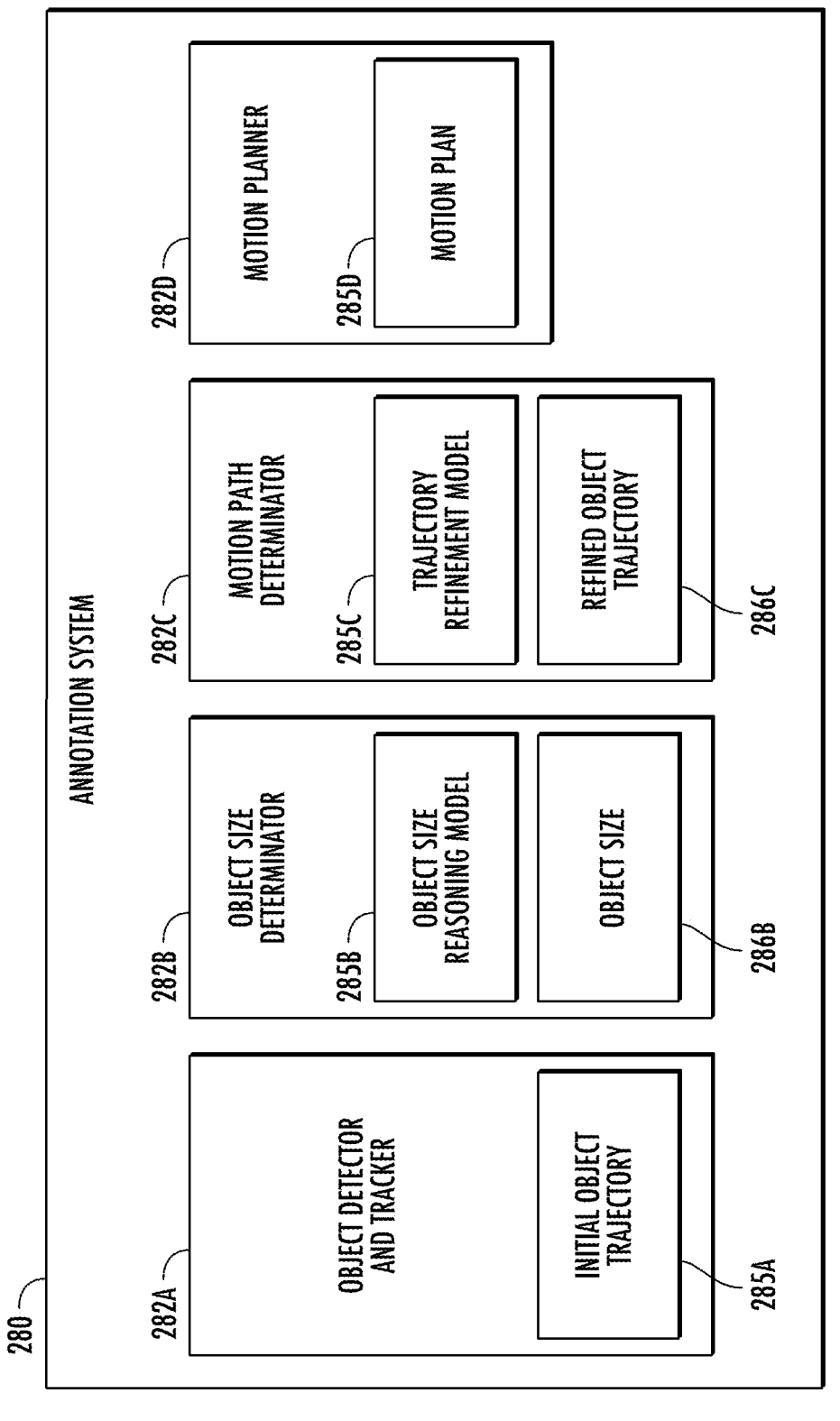
FIG. 2B depicts a block diagram of an annotation system, according to some implementations of the present disclosure.

FIG. 2B depicts an overview of an example annotation system 280 of the robotic platform (e.g., robotic platform 102 of FIG. 1) according to example implementations of the present disclosure. In some implementations for online operation in an autonomous vehicle, the annotation system 280 can be integrated into one or more functions and/or components of the vehicle computing system 214 in FIG. 2A (e.g., autonomy computing system 240). Alternatively, in some implementations for an offline simulation and/or testing system, the annotation system 280 can be part of an offline simulation and/or testing system, such as the remote computing system(s) 290B in FIG. 2A.

In some instances, the annotation system 280 can obtain sensor data 255, map data 260, and data from positioning system 265 of FIG. 2A to determine the motion path for an object and to determine the motion plan for the vehicle 212 as described in FIGS. 3A-8.

The annotation system 280 can identify one or more objects that are within the surrounding environment of the vehicle 212 based at least in part on the sensor data 255. The initial object trajectory 285A can be determined based on the obtained sensor data 255 or the map data 260. The objects perceived within the surrounding environment can be those within the field of view of the sensor(s) 235 or predicted to be occluded from the sensor(s) 235. This can include object(s) not in motion or not predicted to move (static objects) or object(s) in motion or predicted to be in motion (dynamic objects/actors). The annotation system 280, using the object detector and tracker, can process the sensor data 255, the map data 260, and other data to obtain the initial object trajectory 285A for an object (e.g., first object 112). The initial object trajectory 285A can include a plurality of initial object observations. Each initial object observation in the plurality of initial object observations can have an object size of the object, an initial object pose of the object, and a timestamp. The timestamp can be associated with a specific timestamp corresponding to when the sensor data 255 was obtained by the sensor(s) 235. As previously mentioned, the object size for each initial object observation can be different, because it is generated from the sensor data 225. The pose for each initial object observation can include the center location of the object or a corner location of the object at the specific timestamp. The pose can also include an orientation of the object at the specific timestamp.

Additionally, the annotation system 280 can generate initial object trajectory 285A that is indicative of one or more states (e.g., current, or past state(s)) of one or more objects that are within a surrounding environment of the vehicle 212. For example, the initial object trajectory 285A for each object can describe (e.g., for a given time, time period) an estimate of the object's: current or past location (also referred to as position); current or past speed/velocity; current or past acceleration; current or past heading; current or past orientation; size/footprint (e.g., as represented by a bounding shape, object highlighting, etc.); class (e.g., pedestrian class vs. vehicle class vs. bicycle class, etc.), the uncertainties associated therewith, or other state information. The initial object trajectory 285A can be utilized for functions of the object size determinator 282B and the motion path determinator 282C. For example, the initial object trajectory 285A of the object can be an input to the object size reasoning model 285B of the object size determinator 282B in order to determine the object size 286B of the object.

The annotation system 280 can utilize one or more algorithms or machine-learned model(s), such as the object size reasoning model 285B and the trajectory refinement model 285C, that are configured to identify the size and motion path of an object based at least in part on the sensor data 255. As previously mentioned, the object size reasoning model 285B determines a fixed value (e.g., a single set of bounding box dimensions) for the object size 286B of the object. Additionally, the trajectory refinement model 285C uses the fixed value of the object and employs a spatial-temporal encoder-decoder to refine the refined object trajectory 286C of the object (e.g., first object 112) and the motion plan 285D of the vehicle 212. This can include, for example, one or more neural networks trained to identify object(s) within the surrounding environment of the vehicle 212, determine the object size 286B, refine the refined object trajectory 286C, and other data associated therewith.

The motion path determinator 282C of annotation system 280 can be configured to refine a refined object trajectory 286C (e.g., motion path) of the object(s) within the surrounding environment of the vehicle 212. For instance, the annotation system 280 can generate the refined object trajectory 286C associated with such object(s) by using the trajectory refinement model 285C. The initial object trajectory 285A and the fixed value for the object size 286B can be inputted into the trajectory refinement model 285C in order to determine refined object trajectory 286C. The refined object trajectory 286C can be indicative of one or more predicted future locations of each respective object. The motion path of the object can be based on the refined object trajectory 286C. For example, the motion path determinator 282C can determine a predicted motion trajectory along which a respective object is predicted to travel over time. A predicted motion trajectory can be indicative of a path that the object is predicted to traverse and an associated timing with which the object is predicted to travel along the path. The predicted path can include or be made up of a plurality of way points. In some implementations, the refined object trajectory 286C can be indicative of the speed or acceleration at which the respective object is predicted to travel along its associated predicted motion trajectory.

The annotation system 280 can utilize one or more algorithms or machine-learned model(s), such as the trajectory refinement model 285C, that are configured to determine the refined object trajectory 286C based at least in part on the sensor data 255, initial object trajectory 285A, the fixed value for the object size 286B, map data 260, or other data. This can include, for example, one or more neural networks trained to determine the refined object trajectory 286C within the surrounding environment of the vehicle 212 based at least in part on the past or current state(s) of those objects as well as the environment in which the objects are located (e.g., the lane boundary in which it is traveling). The refined object trajectory 286C can be utilized for the motion planning functions of motion planner 282D of the annotation system 280 in order to determine or optimize the motion plan 285D of the vehicle.

The machine-learned models (e.g., object size reasoning model 285B, trajectory refinement model 285C) can be previously trained by the one or more remote computing system(s) 290B, the operations computing system 290A, or any other device (e.g., remote servers, training computing systems, etc.) remote from or onboard the vehicle 212. For example, the machine-learned models can be learned by a training computing system (e.g., the operations computing system 290A, etc.) over training data stored in a training database. The training data can include sequential multimodal sensor data indicative of a plurality of environments at different interval of time. In some implementations, the training data can include sensor data 255, initial object trajectory 285A, object size 286B (e.g., bounding box), refined object trajectory 286C, motion plan 285D, object data, traffic element data, and implementation plan associated with a trajectory of an object.

Figure 3A:
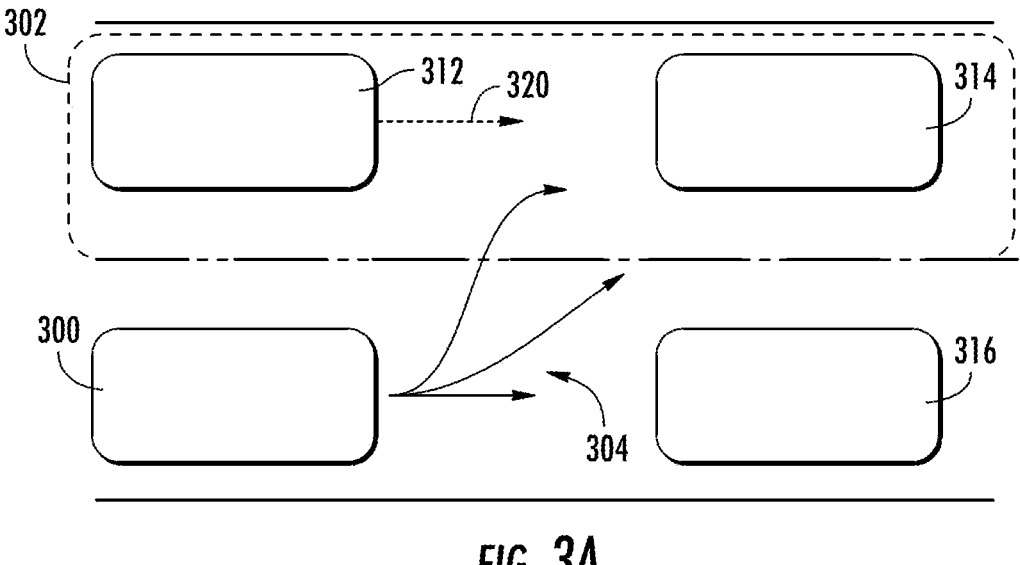
FIGS. 3A and 3B illustrate aspects of a joint planning/prediction approach according to some implementations of the present disclosure.
Figure 3B:
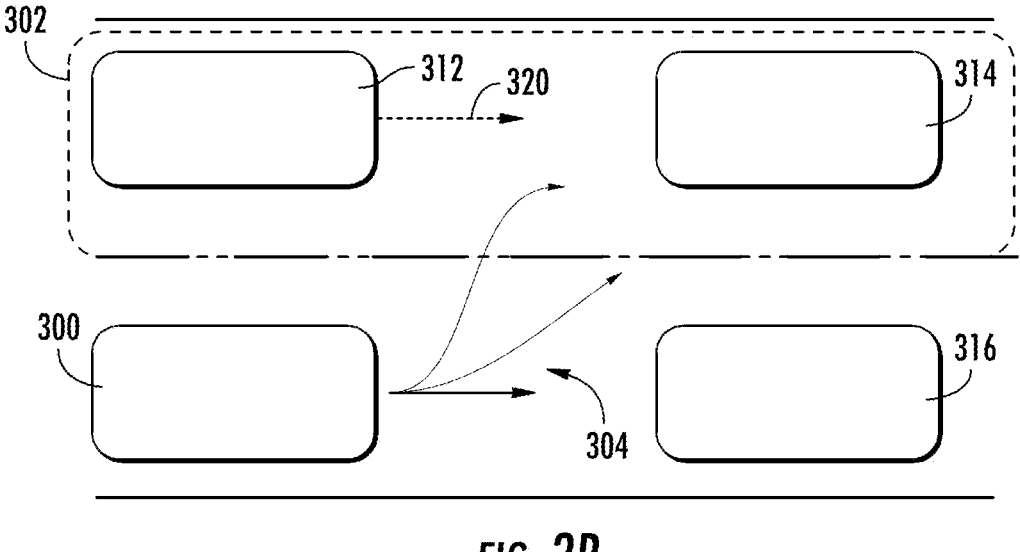

FIGS. 3A and 3B illustrates aspects of a joint planning/prediction approach according to some implementations of the present disclosure. In some implementations, an annotation system 280 can implement interactive planning or noninteractive planning, as well as combinations thereof. For example, FIG. 3A illustrates an ego-actor, such as autonomous vehicle 300, traversing a lane of a roadway. It might be desired for the autonomous vehicle 300 to change lanes to move into the other lane 302 (e.g., by following one or more vehicle motion trajectories 304). However, the autonomous vehicle 300 is sharing the roadway with objects 312, 314, and 316 (e.g., other actors). And it can be predicted (e.g., by object size determinator 282B) that object 312 will continue moving forward in lane 302 along object trajectory 320 and maintain the same distance behind object 314, which may not leave sufficient room for autonomous vehicle 300 to maneuver into lane 302 while meeting other constraints (e.g., buffer space constraints, etc.). Based on this prediction, for example, the autonomous vehicle 300 can choose one of the motion trajectories 304 that does not interfere with the object 312 on the object trajectory 320 (e.g., as illustrated in FIG. 3B).

In some scenarios, the other objects 312, 314, and 316, absent an external factor, might never move in such a way as to permit the autonomous vehicle 300 to ever obtain sufficient space (e.g., between objects 312 and 314) to change lanes. For instance, object 312 might never have any interaction with any motion of autonomous vehicle 300 (e.g., never cooperatively adapt to the motion of the autonomous vehicle 300). But in some scenarios, the object 312 might interact with a motion of the autonomous vehicle 300 in such a way as to open up space in the lane 302.

Figure 4:
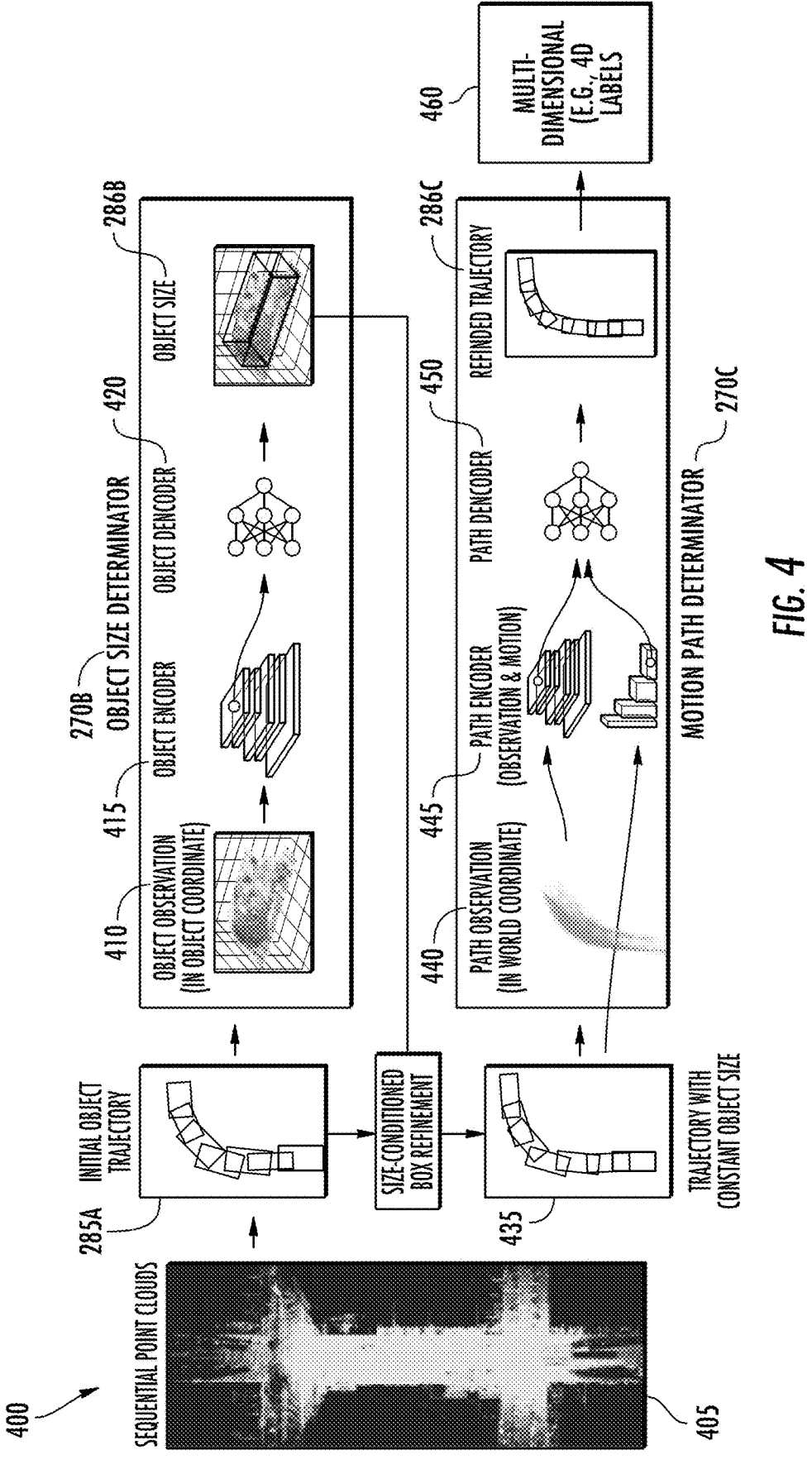
FIG. 4 depicts an annotation system configured to automate the annotation of objects, according to some implementations of the present disclosure.

FIG. 4 depicts an annotation system 400 configured to automate the annotation (e.g., labeling) of objects, according to some implementations of the present disclosure. The annotation system 400 can include any of the system(s) (e.g., annotation system 110, robotic platform 202, vehicle 212, vehicle computing system 214, annotation system 280, remote computing system 290B, operations computing system 290A, etc.) described herein such as, for example, with reference to FIGS. 1-2B. FIG. 4 illustrates an automatic annotation process being implemented by the annotation system 400, according to some implementations of the present disclosure. The process first defines the problem being solved by introducing the input and output representations. The process then determines a permanent attribute of the object (e.g., object size 286B), and the transient attribute (e.g., pose, motion path of the object, refined object trajectory 286C).

FIG. 4 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 4 is described with reference to elements/terms described with respect to other systems and figures for exemplary illustrated purposes and is not meant to be limiting. One or more portions of the operations and phases described in FIG. 4 can be performed additionally, or alternatively, by other systems.

While confident estimates from conventional models have proven to be useful as pseudo labels, there is still a huge gap between these pseudo labels and human annotated labels, especially in terms of localization precision. To close such gap, the annotation system 400 is designed to refine these noisy estimates at trajectory level by reasoning from sensor data (e.g., sensor data 255 in FIG. 2A).

Initialization Phase

In some instances, the annotation system 400 obtains 3D measurements across time of a scene captured by sensor(s) 235 of vehicle 212 (e.g., a LiDAR sensor on top of a self-driving vehicle). Additionally, the annotation system 400 includes a pre-trained 3D object detector and tracker 282A to generate the initial object trajectory 285A. The annotation system 400 then processes each initial object observations in the initial object trajectory 285A to determine the object size 286B and the refined object trajectory 286C. Each initial object observation can have an object size of the object, an initial object pose of the object, and a timestamp.

In particular, the annotation system 400 obtains sequential point clouds 405 captured over the whole log sequence to form the observation $x \in \chi$, where x denotes a set of 4D points (e.g., 3D position and time). In some instances, the 3D spatial dimensions include a first spatial dimension, a second spatial dimension, and a third spatial dimension. For example, the first, second and third spatial dimensions could be representative of x,y,z coordinates in Euclidean space, points in a lateral dimension, a longitudinal dimension, and an altitude dimension, subsets of these example dimensions, or other multi-dimensional representations including 2D or 3D options. The 4D points are represented in the world coordinate system instead of the sensor coordinate system so that the model can reason about the object motion independent of the movement of the robot (e.g., vehicle 212, AV, ego car). The annotation system 400 extracts initial object trajectory 285A from the observations in the same world coordinate system. The objects to be labeled are represented with a 2D bounding box in the bird's eye view (BEV) space. This representation is selected as the typical downstream modules in self-driving since the motion planner (e.g., motion planner 282D) for the AV generates the motion plan 285D in the BEV space. In addition, the position along the height dimension can be determined by the motion planner 282D with heuristics (e.g., ground information from HD maps).

The annotation system 400 first obtains initial object trajectory 285A by applying a pre-trained 3D object detector followed with a discrete tracker (e.g., object detector and tracker 282A). For example, a voxel-based object detector and a multi-object 3D tracker can be used. As a result, each object trajectory is composed of a set of detections $O=\{D_i\}$, where i indexes the frame in which the object is observed. Each detection $D_i=(p, s, t)$ consists of three parts: the object pose $p=(x, y, \theta)$ indicating the center position and orientation at timestamp t, the object size $s=(w, l)$, and the detection timestamp t. The object detector and tracker 282A used in the initial phase may not exploit the assumption that the object size should be constant. Therefore, the initial estimations for the object's size may vary over the trajectory.

While the initial object trajectory O (e.g., initial object trajectory 285A) is produced in the online setting, the annotation system 400 can refine the object trajectory O in the offline setting given the full observation x. For example, online learning is an approach that ingests data one observation at a time, and offline learning is an approach that ingests all the data at one time to build a model. As previously described by the annotation system 280 in FIGS. 2A-B, the annotation system 400 in FIG. 4 can consists of an object size determinator 282B, which reasons about a constant and complete object size from x, and a motion path determinator 282C, which refines the object pose along the trajectory in the world coordinate system. In some implementations, the object pose is a center position of the object and an orientation of the object. In other implementations, the object pose is a corner position of the object and an orientation of the object.

Object Size Determination Phase

The annotation system 400 includes an object size determinator 282B that aggregates partial observations of the object at different timestamps in the object-relative coordinate system. The initialization phase includes bounding boxes that are generated by the object detector and tracker 282A. Subsequently, the object size determinator 282B produces a single bounding box size associated with the object for the entire trajectory. Over the course of the trajectory, the relative motion between the robot (e.g., vehicle 212, AV, ego-vehicle, subject vehicle, vehicle under test) and the object (e.g., first object 112, second object 114) allows for observations of the same object from different viewpoints, thus creating a denser and more complete point cloud. The denser and more complete point cloud allows the object size determinator 282B to produce object size estimates with higher accuracy than online detectors that use single (or a small number of) sweeps.

According to some embodiments, in the first operation of the object size determination phase, the object size determinator 282B generates an object observation 410. Given the sequential point cloud data x (e.g., sequential point clouds 405) and initial object trajectory O (e.g., initial object trajectory 285A), the object size determinator 282B generates an object observation 410 by constructing a dense point cloud by aggregating the points belonging to the object.

The object observation 410 is generated by extracting points for each detection D=(position p, size s, timestamp t), where the object size determinator 282B extracts points inside the bounding box defined by D from the corresponding LiDAR sweep. In some instances, to be robust to detection noise, the object size determinator 282B scales up the bounding box size s=(width w, length l) by a value larger than 1 (e.g., 1.1×) when extracting interior points. The object size determinator 282B then transforms these detection-specific points from world coordinates to object coordinates and aggregates these partial observations over the sequence (by aligning the center positions and orientations of detections across all timestamps). The resulting object observation $$x^O_{Box},$$

which is an example of the object observation 410, can be considered as a noisy shape reconstruction of the object. The noise can come from the errors in the initialization of the motion path and bounding box size.

According to some embodiments, in the second operation of the object size determination phase, the object size determinator 282B uses an object encoder 415 to extract high-resolution spatial features in BEV, which can later be used by the object size determinator 282B to determine about the object size. Towards this goal, the annotation system 400 projects the points in object observation 410 to the BEV plane and generates the corresponding pseudo-image in BEV. Then, the object size determinator 282B applies a 2D convolutional neural network (CNN) to effectively enlarge the receptive field and handle variance in object scale, as shown in Equation 1.

$$F_{Object} = CNN_{Box}(x^O_{Box}) \qquad \text{(Equation 1)}$$

In some instances, to preserve fine-grained details while being efficient in computation, the object size determinator 282B generates the BEV pseudo-image by voxelizing the point clouds with a predetermined voxel size (e.g., 5×5 cm²). The time information in the object observation 410 can be ignored for the purpose of object size estimation. The output of the object encoder 415 is a 3D feature map $F_{Object}$ of size Channel C×Height H×Width W, where Height H×Width W are the BEV dimensions.

According to some embodiments, in the third operation of the object size determination phase, the object size determinator 282B uses an object decoder 420 to decode the 3D feature map $F_{Object}$. Since the receptive field in $F_{Object}$ is large enough to cover the whole object, the object decoder 420 can simply query the feature at object center from $F_{Object}$, and apply a multilayer perceptron (MLP) to predict the object size, as shown in Equation 2. The feature query operator is implemented via bilinear interpolation at object center c (i.e., BEV coordinate (0, 0)).

$$s' = MLP_{Size}\, F_{Object}(c) \qquad \text{(Equation 2)}$$

According to some embodiments, in the fourth operation of the object size determination phase, the object size 286B of the object is refined by the object size determinator 282B.

By exploiting denser observations over the entire trajectory, the object size determinator 282B produces an accurate size estimate of the object that can be fixed for the motion path determination phase. Additionally, the reconstruction of a noisy shape works on both moving and static objects even when the vehicle 212 does not have a precise location in the world coordinate, because points are aggregated in the object-relative coordinate. Moreover, when the annotation system 400 does obtains high-precision localization data for the vehicle using the map data 260 and the positioning system 265, the annotation system 400 achieves better size estimation for static objects by aggregating points in the world coordinate, which bypasses the noise from imperfect detections.

Once the new size estimate for the object size 286B is determined, the annotation system 400 updates all detections over the trajectory to leverage the constant size constraint of objects. For example, the annotation system 400 generates an updated initial object trajectory 435 by updating the width and length of the bounding boxes while retaining the original object center and orientation in the center-aligned orientation implementation. In the corner-aligned implementation, the annotation system 280 generates an updated initial object trajectory 435 by updating the width and length of the bounding boxes while retaining the original object corner position and orientation. Subsequently, the annotation system 400 can generate one or more multi-dimensional (e.g., 4D) labels 460 based on the refined trajectory 286C.

Figure 5A:
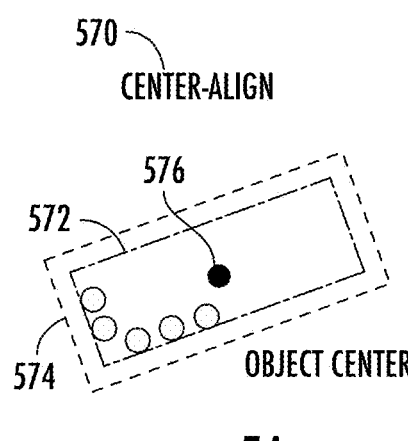
FIGS. 5A and 5B depict a comparison of a center-aligned orientation implementation and a corner-aligned orientation implementation of an annotation process, according to some implementations of the present disclosure.
Figure 5B:
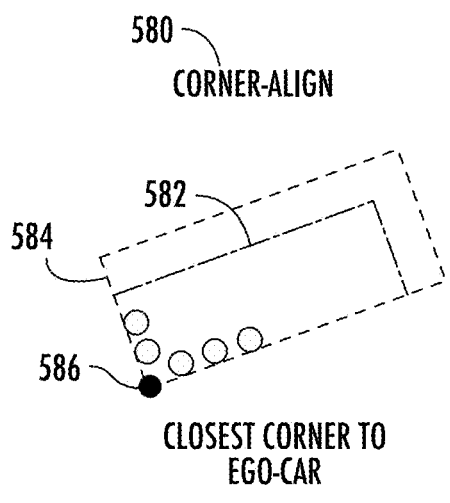

FIGS. 5A and 5B depict a comparison of the center-aligned orientation implementation 570 and the corner-aligned orientation implementation 580, according to some implementations of the present disclosure. FIGS. 5A and 5B illustrates the two different strategies to refine the detection box given the new box size. In some instances, object detections produced from the sensor data 255 (e.g., LiDAR data) can have errors, and the errors can be biased. For example, the 3D point observations (e.g., object observation 410) of vehicles tend to show a subset of the corners and sides of a vehicle, while the other corners and sides are hidden due to occlusion.

In the center-aligned orientation implementation 570 in FIG. 5A, the annotation system 280 can anchor the newly refined box 574 to the center 576 the vehicle 212 (shown in FIG. 2A). Additionally, the annotation system 280 can adjusts the width and length of the bounding box accordingly based on the object size 286B determined by the object size determinator 282B.

In the corner-aligned orientation implementation 580 in FIG. 5B, the annotation system 280 can anchor the newly refined box 282 to the corner 286 closest to the vehicle 212 (shown in FIG. 2A), which can be clearly visible and easily determined from the sensor data 255. Additionally, the annotation system 280 adjusts the width and length of the bounding box accordingly based on the object size 286B determined by the object size determinator 282B.

As illustrated in FIG. 5B, the corner-aligned orientation implementation 580 can produce more accurate trajectories. In this example, the dotted boxes 572, 582 are the original boxes, while the dashed boxes 574, 584 are the refined boxes with the object size 286B that is determined by the object size determinator 282B. The corner-aligned orientation implementation 580, which includes aligning to the closest corner, produces significantly better results as it takes into account different localization uncertainties of visible and occluded corners.

Object Motion Path Determination Phase

Referring back to FIG. 4, according to some embodiments, the motion path determinator 282C, using the updated initial object trajectory 435, generates a refined object trajectory 286C by smoothing the motion path of the object trajectory after determining the object size 286B. In some instances, the movement of various traffic agents (e.g., other vehicles, bicycles, pedestrians) follow certain physical constraints, which is under exploited by online detectors and trackers (e.g., object detector and tracker 282A). In conventional systems, a pre-defined kinematic model can capture the movement of various traffic agents, but these methods do not generalize well to different vehicles. In contrast, the motion path determinator 282C adopts a learning-based approach that learns from both sensor data 255 and sequential object states to determine the refined object trajectory 286C. The motion path determinator 282C can rely on the sensor observation to better localize the detection at each frame and can exploit temporal motion information to obtain additional cues for frames where the object observations are sparse or heavily occluded.

According to some embodiments, in the first operation of the object motion path determination phase, the motion path determinator 282C can generate a path observation 440 in world coordinates. In some instances, the motion path determinator 282C generates the aggregated observation by extracting points within the object trajectory O={$D_i$} from the sequential point cloud x (e.g., sequential point cloud 405) to generate $$x^O_{Path}$$

(e.g., path observation 440). The extraction process can be similar to the extraction process described earlier to generate the object observation 410, with the exclusion of the world-to-object coordinate transformation and inclusion of time information in the point clouds. For example, the path observation 440 is in the world coordinate and includes time information in the point clouds. Keeping the 4D points in the world coordinates helps retain the accurate displacement information for effective motion reasoning by the motion path determinator 282C.

According to some embodiments, in the second operation of the object motion path determination phase, the motion path determinator 282C uses a path encoder 445 to extract fine-grained spatial-temporal features from the 4D point clouds $$x^O_{Path}$$

(e.g., path observation 440). Based on real-life observations, vehicles follow largely smooth trajectories in practice, which provides a strong regularization to improve object localization at each interval of time (e.g., timeframe). As a result, the motion path determinator 282C can explicitly encode the motion feature. Specifically, the motion path determinator 282C generates a 3D voxel grid by consolidating both the height and time dimension as feature channels and apply a 2D CNN to extract multi-scale feature maps, as described in Equation 3. For example, the path encoding can have a similar architecture to CNN$_{box}$ (from Equation 1) with wider channels in the first block to account for additional time input since the path observation 440 includes the time information in the point clouds.

$$F_{Path} = CNN_{Path}\left(x^O_{Path}\right) \qquad \text{(Equation 3)}$$

The output of the path encoder 445 is a 3D feature map $F_{Path}$ with the shape of Channel C×Height H×Width W, where Height H×Width W is the BEV dimension, and C is the channel dimension. In some instances, the motion path determinator 282C first extracts frame-wise motion features for each detection as the pose displacement from the previous frame in order to model the motion path of the object, as illustrated in Equation 4. For the first frame, the motion path determinator 282C can set the motion features to zero.

$$h^i_{Motion} = \left[x^i - x^{i-1}, y^i - y^{i-1}, \theta^i - \theta^{i-1}\right] \qquad \text{(Equation 4)}$$

In some instances, the motion path determinator 282C then can concatenate these frame-wise motion features along the time dimension and perform temporal feature extraction with a 1D CNN based U-Net, as illustrated in Equation 5. U-Net is a convolutional neural network that is based on the fully convolutional network and its architecture is modified and extended to work with fewer training images and to yield more precise segmentations.

$$F_{Motion} = UNet_{convID}\left(h_{motion}\right) \qquad \text{(Equation 5)}$$

According to some embodiments, in the third operation of the object motion path determination phase, the motion path determinator 282C can use a path decoder 450 to decode the motion path of the object in a convolutional manner. The refined object trajectory 286C can be determined from a motion path of the object. For example, given the initial detection D=(x, y, θ, w, l, t) along the trajectory, the annotation system 280 predicts its pose refinement Δp=(Δx; Δy; Δθ) taking into account both the LiDAR voxel feature as well as the motion feature, as illustrated in Equation 6, where p=(x, y) is the detection center, and t is the detection timestamp.

$$\Delta p = MLP_{Path}([F_{Path}(p), F_{Motion}(t)]) \qquad \text{(Equation 6)}$$

The refined pose p'=(x'; y'; θ') is then computed as follows: x'=(1+Δx)*x; y'=(1+Δy)*y; θ'=θ+Δθ. The voxel feature query $F_{Path}(p)$ is implemented as a bilinear interpolation, while the motion feature query $F_{Motion}(t)$ is done by indexing.

Learning and Inference Phase

With regards to the learning and inference of the annotation system 280, since the motion path determinator 282C for path refinement depends on the output of the object size determinator 282B for box refinement, the annotation system 280 trains the object size determinator 282B and the motion path determinator 282C sequentially. For example, the object size determinator 282B can be first trained, and then the motion path determinator 282C can be trained. In some instances, the same loss L(D, G) is applied to the object size determinator 282B and the motion path determinator 282C, which is defined as the Intersection-over-Union (IoU) loss between the estimated and ground truth bounding boxes. When the IoU is zero (i.e., no overlap), the loss falls back to the smooth $l_1$ loss between the branch output and ground-truth values.

During inference, for each detected object trajectory in the log sequence, the annotation system 280 first applies the object size determinator 282B to update the frame-wise boxes with a constant size. Then, the annotation system 280 applies the motion path determinator 282C to the entire trajectory in a sliding window fashion. The annotation system 280 can be applicable to both static and moving objects. To avoid small motions for static objects, the annotation system 280 can add a classification output to the pre-trained object detector to determine whether the object is a static object or a moving object. If it is a static object, the motion path determinator 282C is applied only once on the frame with the highest confidence score.

FIG. 6 depicts a flowchart of a method 600 for improving performance of an autonomous vehicle by optimizing the motion plan of the autonomous vehicle, according to aspects of the present disclosure. The motion plan of the vehicle can be optimized based on the refined object trajectory 286C of an object. One or more portion(s) of the method 600 can be implemented by a computing system that includes one or more computing devices such as, for example, the computing systems described with reference to the other figures (e.g., robotic platform 202, vehicle computing system 214, annotation system 280, operations computing system(s) 290A, remote computing system(s) 290B, annotation system 400). Each respective portion of the method 600 can be performed by any (or any combination) of one or more computing devices. Moreover, one or more portion(s) of the method 600 can be implemented as an algorithm on the hardware components of the device(s) described herein (e.g., FIGS. 1-2B, 4, 7), for example, to train a machine-learning model (e.g., object size reasoning model 285B, trajectory refinement model 285C), to generate a refined object trajectory 286C, to generate a motion plan 285D, or to generate 4D labels as described in FIGS. 2A-B and 4.

FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 6 is described with reference to elements/terms described with respect to other systems and figures for exemplary illustrated purposes and is not meant to be limiting. One or more portions of method 600 can be performed additionally, or alternatively, by other systems.

At 610, a computing system (e.g., vehicle computing system 214, annotation system 280, annotation system 400) obtains sensor data (e.g., sensor data 255) from one or more sensors (e.g., first sensor(s) 106, second sensor(s) 108, sensor(s) 235) coupled (e.g., attached) to an autonomous vehicle (AV). The sensor data can be sequential over a period of time. For example, the one or more sensors includes a LiDAR sensor, and the raw sensor data includes a series of sequential point clouds of LiDAR data. In some instances, the computing system can be the robotic platform 202, vehicle computing system 214, annotation system 280, operations computing system(s) 290A, remote computing system(s) 290B, and/or annotation system 400. In some instances, the AV can be the vehicle 212.

At 620, the computing system generates an initial object trajectory (e.g., initial object trajectory 285A) for an object using the sensor data. The initial object trajectory includes a plurality of initial object observations respectively associated with parameters including an object size of the object, an initial object pose of the object, and a timestamp. For example, the object can be traffic agent, such as, but not limited to, a vehicle, a pedestrian, or a bicycle. In some implementations, the object be either a moving object or an object that does not move. In some instances, the object size of the object can include a width and length of a bounding box that corresponds to the object.

In some instances, the initial object pose includes a center position of the object at the timestamp and an orientation of the object at the timestamp. In a center-aligned implementation (e.g., center-aligned implementation 570), the center position can correspond to a location of the object's center and an orientation of the object at the timestamp.

In some instances, the initial object pose includes a corner position of the object at the timestamp and an orientation of the object at the timestamp. In a corner-aligned implementation (e.g., corner-aligned implementation 580), the bounding box can be anchored to the corner closest to the AV, which is likely the most visible, and adjust the width and length of the bounding box accordingly. The corner-aligned implementation can also include the orientation of the object at the timestamp. In some example implementations, the initial object pose can be determined as a combination (e.g., a weighted combination) of different orientation implementations, such as but not limited to a combination of the center-aligned implementation 570 and the corner-aligned implementation 580.

At 630, the computing system determines, based on the sensor data and the plurality of initial object observations, a fixed value for the object size (e.g., object size 286B) of the object. In some implementations, operation 630 can further include the computing system converting the sensor data into an object coordinate system by aligning the center position of the object and the orientation of the object over multiple timestamps in the plurality of initial object observations. In some implementations, operation 630 can further include the computing system providing the plurality of initial object observations to an object encoder (e.g., object encoder 415) and an object decoder (e.g., object decoder 420), where the object encoder extracts high-resolution features of the object in a bird's-eye-view (BEV) space in order to determine the fixed value.

At 640, the computing system generating an updated initial object trajectory (e.g., updated initial object trajectory 435) for the object including a plurality of updated initial object observations. The object size in the plurality of updated initial object observations corresponds to the fixed value.

In some instances, the object can be another vehicle, a bicycle, or a pedestrian. Additionally, the updated initial object trajectory can be generated based on physical constraints of the object. As previously mentioned, the movement of different traffic agents can follow certain physical constraints. For example, when the object is another vehicle, the computing system can generate the updated initial object trajectory based on certain physical constraints (e.g., top speed, acceleration range, stopping constraints, turning constraints) of the other vehicle.

At 650, the computing system determines, based on the sensor data and the updated initial object trajectory, a refined object trajectory (e.g., refined object trajectory 286C) including a plurality of refined object observations respectively including an updated object pose of the object for the plurality of refined object observations.

In some implementations, operation 650 can further include the computing system converting the sensor data into a world coordinate system to generate a path observation (e.g., path observation 440), where a motion path of the object (e.g., refined object trajectory 286C) is determined independent of a movement associated with the AV.

In some implementations, operation 650 can further include the computing system providing the plurality of updated initial object observations to a path encoder (e.g., path encoder 445) and a path decoder (e.g., path decoder 450). The path encoder can extract spatial-temporal features from four-dimensional point clouds that are generated from the sensor data.

In some implementations, operation 650 can further include the computing system determining a height dimension of the object based on ground data obtained from high-definition maps.

At 660, the computing system generates a multi-dimensional label for the object based on the refined object trajectory (e.g., refined object trajectory 286C0. In some instances, the multi-dimensional label for the object includes a bounding box defined relative to a plurality of spatial dimensions and a time dimension corresponding to the period of time. In a center-aligned implementation (e.g., center-aligned implementation 570), the spatial dimensions can include width and length of the bounding box, a location of the object's center and an orientation of the object. In a corner-aligned implementation (e.g., corner-aligned implementation 580), the bounding box is anchored to the corner closest to the AV, which is likely the most visible, and adjust the width and length of the bounding box accordingly. The corner-aligned implementation can also include the orientation of the object.

Additionally, the multi-dimensional label can include a time dimension corresponding to the period of time. The period of time can be determined based on sensor data obtained at 610 that is sequential over a period of time. For example, the sensor data can have different video frames associated with a corresponding period of time.

In some implementations, method 600 further includes the computing system generating a motion plan for the AV based on the multi-dimensional label. For example, the AV mentioned at 610 can be controlled using the motion plan.

In some implementations, method 600 further includes the computing system training a 4D label generation model using the multi-dimensional label for the object. Additionally, the computing system can detect a second object around the AV using the sensor data. Moreover, the computing system can determine, using the trained 4D label generation model, a multi-dimensional label for the second object.

The method 600 can be further modified by one or more portion(s) of method 700 in FIG. 7. For example, one or more portions of method 700 can be performed in addition to the method 600. FIG. 7 depicts a flowchart of a method 700 for determining an object size for an object, according to aspects of the present disclosure. One or more portion(s) of the method 700 can be implemented by a computing system that includes one or more computing devices such as, for example, the computing systems described with reference to the other figures (e.g., annotation system 280, object size determinator 282B, robotic platform 202, vehicle computing system 214, operations computing system(s) 290A, remote computing system(s) 290B, and/or annotation system 400). Each respective portion of the method 700 can be performed by any (or any combination) of one or more computing devices. Moreover, one or more portion(s) of the method 700 can be implemented as an algorithm on the hardware components of the device(s) described herein (e.g., FIGS. 1-2B, 4, 7). Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 7 is described with reference to elements/terms described with respect to other systems and figures for exemplary illustrated purposes and is not meant to be limiting. One or more portions of method 700 can be performed additionally, or alternatively, by other systems.

At 705, a computing system generates an object observation of an object based on an initial object trajectory. The object observation can be in an object coordinate system. For example, the object observation generated at 705 can be the object observation 410 described in FIG. 4.

At 710, the computing system can encode a plurality of initial object observations by extracting high-resolution features of the object in a bird's-eye-view (BEV) space. The object encoder 415 described in FIG. 4 can perform the encoding at 710.

At 715, the computing system can decode the encoded initial object observations to determine an object size for the object. The object decoder 420 described in FIG. 4 can perform the decoding at 720 to determine the object size 286B.

The method 600 can be further modified by one or more portion(s) of method 800 in FIG. 8. For example, one or more portions of method 800 can be performed in addition to the method 600. FIG. 8 depicts a flowchart of a method 800 for determining a refined object trajectory, according to aspects of the present disclosure. One or more portion(s) of the method 800 can be implemented by a computing system that includes one or more computing devices such as, for example, the computing systems described with reference to the other figures (e.g., annotation system 280, object size determinator 282B, robotic platform 202, vehicle computing system 214, operations computing system(s) 290A, remote computing system(s) 290B, and/or annotation system 400). Each respective portion of the method 800 can be performed by any (or any combination) of one or more computing devices. Moreover, one or more portion(s) of the method 800 can be implemented as an algorithm on the hardware components of the device(s) described herein (e.g., FIGS. 1-2B, 4, 7). Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 8 is described with reference to elements/terms described with respect to other systems and figures for exemplary illustrated purposes and is not meant to be limiting. One or more portions of method 800 can be performed additionally, or alternatively, by other systems.

At 805, a computing system generates a path observation of a motion path of an object based on an initial object trajectory and a determined object size. The path observation can be in a world coordinate system. For example, the path observation generated at 805 can be the path observation 440 described in FIG. 4.

At 810, the computing system provides a plurality of updated initial object observations to a path encoder and a path decoder. Additionally, the path encoder extracts spatial-temporal features from four-dimensional point clouds that are generated from the sensor data. The path encoder 445 described in FIG. 4 can perform the encoding at 810. The path decoder 450 described in FIG. 4 can perform the decoding at 810. The updated initial object observations can be the initial object trajectory 285A with a fixed object size 286B.

At 815, the computing system determines a refined object trajectory for the object using the path decoder. The refined object trajectory 286C described in FIGS. 2 and 4 can be an example of the refined object trajectory determined at 815.

At 820, the computing system determines a height dimension of the object based on ground data obtained from high-definition maps, wherein the multi-dimensional label for the object includes the height dimension of the object.

At 825, the computing system generates multi-dimensional (e.g., 4D) labels for the object based on the determinations at 815 and 820. The multi-dimensional labels 460 described in FIG. 4 can be an example of the 4D labels for the object.

Figure 9:
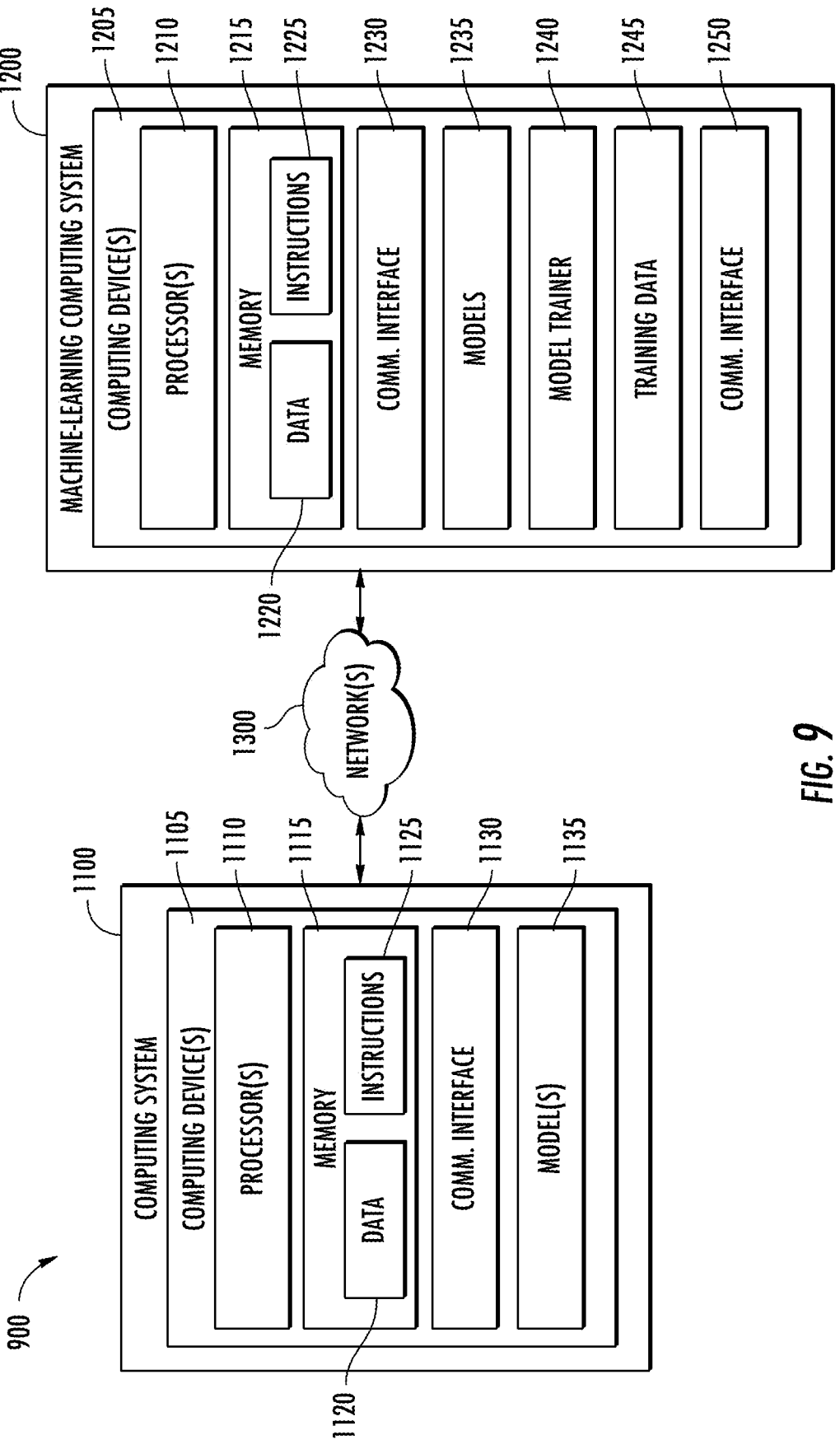
FIG. 9 depicts a block diagram of a computing system, according to some implementations of the present disclosure.

FIG. 9 depicts a block diagram of an example computing system 900 according to example embodiments of the present disclosure. The example computing system 900 includes a computing system 1100 and a machine learning computing system 1200 that are communicatively coupled over one or more networks 1300.

In some implementations, the computing system 1100 can perform one or more observation tasks such as, for example, by obtaining sensor data (e.g., object data, traffic data, multi-modal sensor data) associated with an environment. In some implementations, the computing system 1100 can be included in a robotic platform. For example, the computing system 1100 can be on-board an autonomous vehicle. In other implementations, the computing system 1100 is not located on-board a robotic platform. The computing system 1100 can include one or more distinct physical computing devices 1105.

The computing system 1100 (or one or more computing device(s) 1105 thereof) can include one or more processors 1110 and a memory 1115. The one or more processors 1110 can be any suitable processing device (e.g., a processor core, a microprocessor, an ASIC, a FPGA, a controller, a microcontroller, etc.) and can be one processor or a plurality of processors that are operatively connected. The memory 1115 can include one or more non-transitory computer-readable storage media, such as RAM, ROM, EEPROM, EPROM, one or more memory devices, flash memory devices, etc., and combinations thereof.

The memory 1115 can store information that can be accessed by the one or more processors 1110. For instance, the memory 1115 (e.g., one or more non-transitory computer-readable storage mediums, memory devices) can store data 1120 that can be obtained, received, accessed, written, manipulated, created, or stored. The data 1120 can include, for instance, object data, traffic element data, hybrid graph data, image data, LiDAR data, multi-modal sensor data, models, intermediate and other scene representations, or any other data or information described herein. In some implementations, the computing system 1100 can obtain data from one or more memory device(s) that are remote from the computing system 1100.

The memory 1115 can also store computer-readable instructions 1125 that can be executed by the one or more processors 1110. The instructions 1125 can be software written in any suitable programming language or can be implemented in hardware. Additionally, or alternatively, the instructions 1125 can be executed in logically or virtually separate threads on processor(s) 1110.

For example, the memory 1115 can store instructions 1125 that when executed by the one or more processors 1110 cause the one or more processors 1110 (the computing system 1100) to perform any of the operations, functions, or methods/processes described herein, including, for example, obtain sensor data, generate an object observation, generate a path observation, determine an object size, generate an initial object trajectory, generate a refined object trajectory, determine a motion plan, implement a motion plan, update a machine-learned model, and so on.

According to an aspect of the present disclosure, the computing system 1100 can store or include one or more machine-learned models 1135. As examples, the machine-learned models 1135 can be or can otherwise include various machine-learned models such as, for example, inpainting networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

In some implementations, the computing system 1100 can receive the one or more machine-learned models 1135 from the machine learning computing system 1200 over network(s) 1300 and can store the one or more machine-learned models 1135 in the memory 1115. The computing system 1100 can then use or otherwise implement the one or more machine-learned models 1135 (e.g., by processor(s) 1110). In particular, the computing system 1100 can implement the machine learned model(s) 1135 to obtain sensor data, generate an object observation, generate a path observation, determine an object size, generate an initial object trajectory, generate a refined object trajectory, determine a motion plan, implement a motion plan, update a machine-learned model, and so on.

The machine learning computing system 1200 can include one or more computing devices 1205. The machine learning computing system 1200 can include one or more processors 1210 and a memory 1215. The one or more processors 1210 can be any suitable processing device (e.g., a processor core, a microprocessor, an ASIC, a FPGA, a controller, a microcontroller, etc.) and can be one processor or a plurality of processors that are operatively connected. The memory 1215 can include one or more non-transitory computer-readable storage media, such as RAM, ROM, EEPROM, EPROM, one or more memory devices, flash memory devices, etc., and combinations thereof.

The memory 1215 can store information that can be accessed by the one or more processors 1210. For instance, the memory 1215 (e.g., one or more non-transitory computer-readable storage mediums, memory devices) can store data 1220 that can be obtained, received, accessed, written, manipulated, created, or stored. The data 1220 can include, for instance, object data, traffic element data, hybrid graph data, multi-modal sensor data, intermediate representations, scene representations, simulation data, data associated with models, or any other data or information described herein. In some implementations, the machine learning computing system 1200 can obtain data from one or more memory device(s) that are remote from the machine learning computing system 1200.

The memory 1215 can also store computer-readable instructions 1225 that can be executed by the one or more processors 1210. The instructions 1225 can be software written in any suitable programming language or can be implemented in hardware. Additionally, or alternatively, the instructions 1225 can be executed in logically or virtually separate threads on processor(s) 1210.

For example, the memory 1215 can store instructions 1225 that when executed by the one or more processors 1210 cause the one or more processors 1210 (the computing system) to perform any of the operations or functions described herein, including, for example, obtaining sensor data, generating an object observation, generating a path observation, determining an object size, generating an initial object trajectory, generating a refined object trajectory, determining a motion plan, implementing a motion plan, updating a machine-learned model, and so on.

In some implementations, the machine learning computing system 1200 includes one or more server computing devices. If the machine learning computing system 1200 includes multiple server computing devices, such server computing devices can operate according to various computing architectures, including, for example, sequential computing architectures, parallel computing architectures, or some combination thereof.

In addition, or alternatively to the model(s) 1235 at the computing system 1100, the machine learning computing system 1200 can include one or more machine-learned models 1235. As examples, the machine-learned models 1235 can be or can otherwise include various machine-learned models such as, for example, inpainting networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

In some implementations, the machine learning computing system 1200 or the computing system 1100 can train the machine-learned models 1135 or 1235 through use of a model trainer 1280. The model trainer 1280 can train the machine-learned models 1135 or 1235 using one or more training or learning algorithms. One example training technique is backwards propagation of errors. In some implementations, the model trainer 1280 can perform supervised training techniques using a set of labeled training data. In other implementations, the model trainer 1280 can perform unsupervised training techniques using a set of unlabeled training data. The model trainer 1280 can perform a number of generalization techniques to improve the generalization capability of the models being trained. Generalization techniques include weight decays, dropouts, or other techniques.

In particular, the model trainer 1280 can train a machine-learned model 1135 or 1235 based on a set of training data 1245. The training data 1245 can include, for example, object data, traffic element data, hybrid graph data, data associated with the interaction prediction model, data associated with the graph neural network data, labeled sequential multi-modal sensor data indicative of a plurality of environments at different interval of time (e.g., timeframe, timesteps), and so on. In some implementations, the training data can include a plurality of environments previously recorded by the autonomous vehicle with dynamic objects removed. The model trainer 1280 can be implemented in hardware, firmware, or software controlling one or more processors.

The computing system 1100 and the machine learning computing system 1200 can each include a communication interface 1130 and 1250, respectively. The communication interfaces 1130/1250 can be used to communicate with one or more systems or devices, including systems or devices that are remotely located from the computing system 1100 and the machine learning computing system 1200. A communication interface 1130/1250 can include any circuits, components, software, etc. for communicating with one or more networks (e.g., 1300). In some implementations, a communication interface 1130/1250 can include, for example, one or more of a communications controller, receiver, transceiver, transmitter, port, conductors, software, or hardware for communicating data.

The network(s) 1300 can be any type of network or combination of networks that allows for communication between devices. In some embodiments, the network(s) can include one or more of a local area network, wide area network, the Internet, secure network, cellular network, mesh network, peer-to-peer communication link or some combination thereof and can include any number of wired or wireless links. Communication over the network(s) 1300 can be accomplished, for instance, through a network interface using any type of protocol, protection scheme, encoding, format, packaging, etc.

FIG. 9 illustrates one example computing system 900 that can be used to implement the present disclosure. Other computing systems can be used as well. For example, in some implementations, the computing system 1100 can include the model trainer 1280 and the training data 1245. In such implementations, the machine-learned models 1235 can be both trained and used locally at the computing system 1100. As another example, in some implementations, the computing system 1100 is not connected to other computing systems.

In addition, components illustrated or discussed as being included in one of the computing systems 1100 or 1200 can instead be included in another of the computing systems 1100 or 1200. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein.

Those of ordinary skill in the art, using the disclosures provided herein, will understand that the elements of any of the claims discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of steps or operations.

What is claimed is:

1. A method comprising:

obtaining sensor data from one or more sensors attached to an autonomous vehicle (AV), the sensor data being sequential over a period of time;

generating, using the sensor data, an initial object trajectory for an object, the initial object trajectory comprising a plurality of initial object observations respectively having an object size of the object, an initial object pose of the object, and a timestamp;

providing the sensor data and the initial object trajectory to a path encoder and a path decoder, wherein the path encoder extracts features indicative of spatial data and temporal data from four-dimensional point clouds that are generated from the sensor data, and wherein the path decoder determines a refined object trajectory comprising a plurality of refined object observations respectively comprising an updated object pose of the object for the plurality of refined object observations;

generating a multi-dimensional label for the object based on the refined object trajectory; and generating a motion plan for the AV based on the multi-dimensional label, wherein the AV is controlled using the motion plan.

2. The method of claim 1, wherein the multi-dimensional label for the object comprises a bounding shape defined relative to a plurality of spatial dimensions and a time dimension corresponding to the period of time.

3. The method of claim 1, wherein the initial object pose comprises a center position of the object at the timestamp and an orientation of the object at the timestamp.

4. The method of claim 1, further comprising converting the sensor data into a world coordinate system, wherein a motion of the object is determined independent of a movement associated with the AV.

5. The method of claim 1, further comprising determining a height dimension of the object based on ground data obtained from high-definition maps, and wherein the multi-dimensional label for the object includes the height dimension of the object.

6. The method of claim 1, wherein the one or more sensors comprises a light detection and ranging (LiDAR) sensor, and wherein the sensor data comprises a series of sequential point clouds of LiDAR data.

7. The method of claim 1, wherein the object is one of a vehicle, a pedestrian, or a bicycle.

8. The method of claim 1, wherein the object size of the object comprises a fixed value.

9. The method of claim 8, further comprising extracting high-resolution features of the object in a bird's-eye-view (BEV) space, wherein the fixed value is determined at least in part from the high-resolution features.

10. A computing system comprising:

one or more processors; and one or more computer-readable media storing instructions for execution by the one or more processors to cause the computing system to perform operations, the operations comprising:

obtaining sensor data from one or more sensors attached to an autonomous vehicle (AV), the sensor data being sequential over a period of time;

generating, using the sensor data, an initial object trajectory for an object, the initial object trajectory comprising a plurality of initial object observations respectively having an object size of the object, an initial object pose of the object, and a timestamp;

providing the sensor data and the initial object trajectory to a path encoder and a path decoder, wherein the path encoder extracts features indicative of spatial data and temporal data from four-dimensional point clouds that are generated from the sensor data, and wherein the path decoder determines a refined object trajectory comprising a plurality of refined object observations respectively comprising an updated object pose of the object for the plurality of refined object observations;

generating a multi-dimensional label for the object based on the refined object trajectory;

generating a motion plan for the AV based on the multi-dimensional label; and causing the AV to operate according at least partially to the motion plan.

11. The computing system of claim 10, wherein the multi-dimensional label for the object comprises a bounding shape defined relative to a plurality of spatial dimensions and a time dimension corresponding to the period of time.

12. The computing system of claim 10, wherein the initial object pose comprises a center position of the object at the timestamp and an orientation of the object at the timestamp.

13. The computing system of claim 10, the operations further comprising converting the sensor data into a world coordinate system, wherein a motion of the object is determined independent of a movement associated with the AV.

14. The computing system of claim 10, the operations further comprising determining a height dimension of the object based on ground data obtained from high-definition maps, and wherein the multi-dimensional label for the object includes the height dimension of the object.

15. The computing system of claim 10, wherein the one or more sensors comprises a light detection and ranging (LiDAR) sensor, and wherein the sensor data comprises a series of sequential point clouds of LiDAR data.

16. The computing system of claim 10, wherein the object is one of a vehicle, a pedestrian, or a bicycle.

17. The computing system of claim 10, wherein the object size of the object comprises a fixed value.

18. The computing system of claim 17, the operations further comprising extracting high-resolution features of the object in a bird's-eye-view (BEV) space, wherein the fixed value is determined at least in part from the high-resolution features.

19. An autonomous vehicle, comprising:

one or more processors; and one or more computer-readable media storing instructions for execution by the one or more processors to cause the one or more processors to perform operations, the operations comprising:

obtaining sensor data from one or more sensors attached to the autonomous vehicle (AV), the sensor data being sequential over a period of time;

generating, using the sensor data, an initial object trajectory for an object, the initial object trajectory comprising a plurality of initial object observations respectively having an object size of the object, an initial object pose of the object, and a timestamp;

providing the sensor data and the initial object trajectory to a path encoder and a path decoder, wherein the path encoder extracts features indicative of spatial data and temporal data from four-dimensional point clouds that are generated from the sensor data, and wherein the path decoder determines a refined object trajectory comprising a plurality of refined object observations respectively comprising an updated object pose of the object for the plurality of refined object observations;

generating a multi-dimensional label for the object based on the refined object trajectory;

generating a motion plan for the AV based on the multi-dimensional label; and causing the AV to operate according at least partially to the motion plan.

20. The autonomous vehicle of claim 19, wherein the multi-dimensional label for the object comprises a bounding shape defined relative to a plurality of spatial dimensions and a time dimension corresponding to the period of time.

* * * * *